United States Patent
Gibbons, Jr. et al.

(10) Patent No.: US 11,182,257 B2
(45) Date of Patent: Nov. 23, 2021

(54) ADAPTIVE DATA BACKUP SCHEDULING BASED ON RELIABILITY METRIC OR METRICS

(71) Applicant: Datto, Inc., Norwalk, CT (US)

(72) Inventors: Robert J. Gibbons, Jr., Wilton, CT (US); William Robert Speirs, II, Norwalk, CT (US); Neale Campbell Hutcheson, Jr., New Canaan, CT (US); Robert Loce, Webster, NY (US)

(73) Assignee: Datto, Inc., Norwalk, CT (US)

( * ) Notice: Subject to any disclaimer, the term of this patent is extended or adjusted under 35 U.S.C. 154(b) by 108 days.

(21) Appl. No.: 16/541,812

(22) Filed: Aug. 15, 2019

(65) Prior Publication Data
US 2021/0049075 A1 Feb. 18, 2021

(51) Int. Cl.
| | |
|---|---|
| G06F 11/14 | (2006.01) |
| G06F 11/30 | (2006.01) |
| G06F 11/20 | (2006.01) |
| G06F 11/07 | (2006.01) |

(52) U.S. Cl.
CPC ...... *G06F 11/1461* (2013.01); *G06F 11/0757* (2013.01); *G06F 11/1451* (2013.01); *G06F 11/1464* (2013.01); *G06F 11/1469* (2013.01); *G06F 11/1471* (2013.01); *G06F 11/2082* (2013.01); *G06F 11/3058* (2013.01)

(58) Field of Classification Search
CPC ............ G06F 11/1461; G06F 11/2082; G06F 11/0757; G06F 11/1464; G06F 11/1469; G06F 11/1471; G06F 11/1451; G06F 11/3058
See application file for complete search history.

(56) References Cited

U.S. PATENT DOCUMENTS

| | | | |
|---|---|---|---|
| 7,246,207 | B2 | 7/2007 | Kottomtharayil et al. |
| 8,799,245 | B2 | 8/2014 | Amarendran et al. |
| 8,805,806 | B2 | 8/2014 | Amarendran et al. |
| 9,229,818 | B2 | 1/2016 | Doshi et al. |
| 9,645,891 | B2 | 5/2017 | Ahn et al. |
| 10,162,709 | B1 | 12/2018 | Lazier et al. |
| 10,649,857 | B2 | 5/2020 | Banasik et al. |
| 2016/0162364 | A1 | 6/2016 | Mutha et al. |
| 2016/0162374 | A1 | 6/2016 | Mutha et al. |
| 2018/0006870 | A1 | 1/2018 | McChord et al. |

(Continued)

OTHER PUBLICATIONS

U.S. Appl. No. 16/402,949, filed May 3, 2019, Stuart Mark.

*Primary Examiner* — Eric Cardwell
(74) *Attorney, Agent, or Firm* — Fay Sharpe LLP

(57) ABSTRACT

The disclosure provides methods and systems to perform data backups of protected data. According to an embodiment, a nominal backup schedule is received, and a time differential between the nominal backup schedule and a current time metric is determined. If the time differential is greater than a threshold, the backup schedule is modified so that times indicated in the modified backup schedule are at a higher frequency than a frequency of the indicated times of the nominal backup schedule. In another embodiment, if a reliability metric is greater than a corresponding threshold, the backup schedule is modified so that times indicated in the modified backup schedule are at a higher frequency than a frequency of the indicated times of the nominal backup schedule.

36 Claims, 11 Drawing Sheets

(56) References Cited

U.S. PATENT DOCUMENTS

2018/0088825 A1    3/2018  Mutha et al.
2018/0285200 A1*  10/2018  Inbaraj ................ G06F 11/1458
2020/0092334 A1*  3/2020  Hiebert ............... G06F 11/1461
2020/0320215 A1*  10/2020  Bhosale ................ G06F 21/577

* cited by examiner

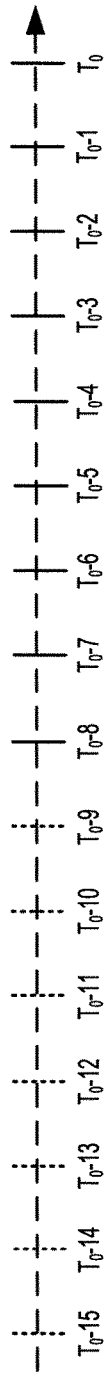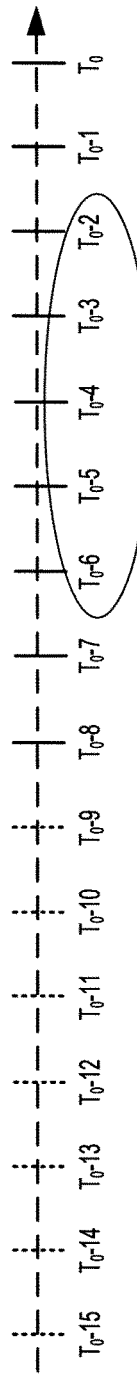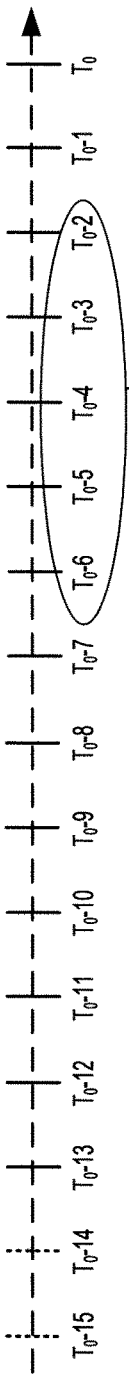

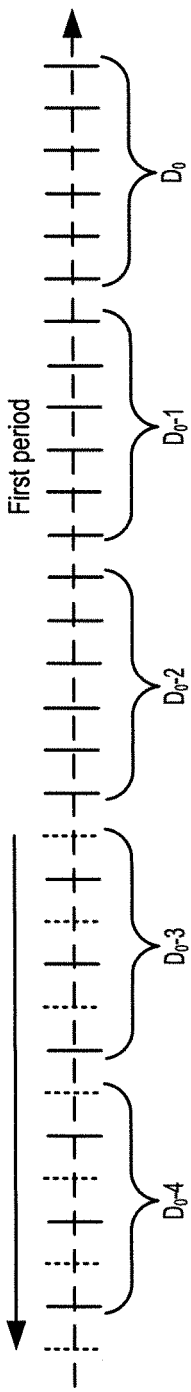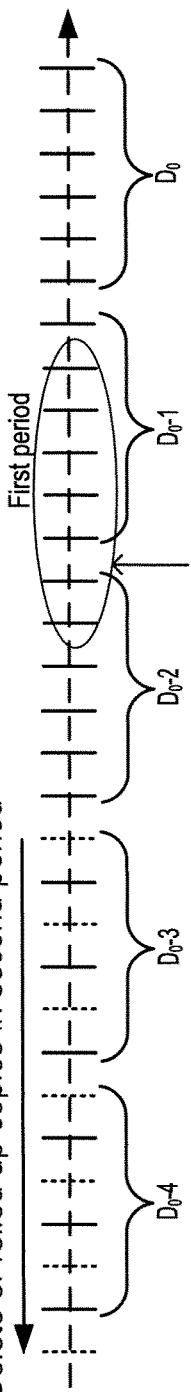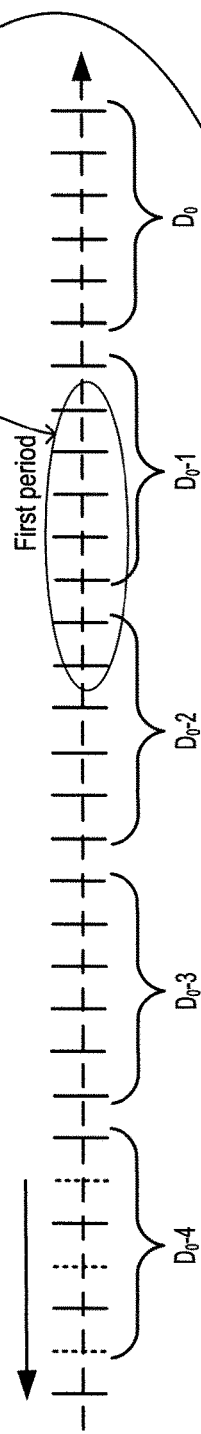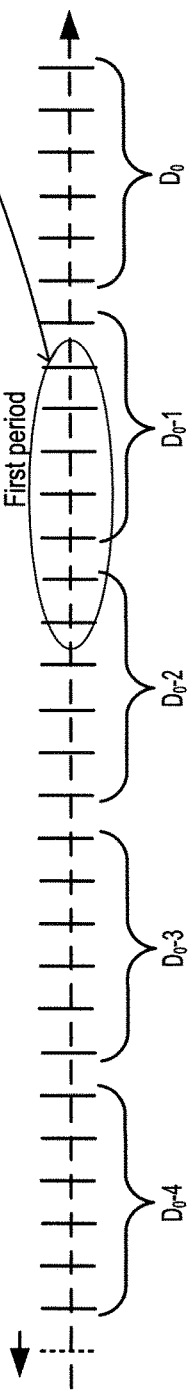

FIG. 6A  a) Normal policy – Retain at high frequency for a first time period and lower frequency at a second period FIG. 6B  b) Normal policy with missing backups – Retain at high frequency for a first time period and lower frequency at a second period FIG. 6C  c) Improved policy with missing backups – Retain a minimum number of high frequency backups FIG. 6D  d) Improved policy with missing backups – Retain a minimum number of high frequency backup segments

ADAPTIVE DATA BACKUP SCHEDULING BASED ON RELIABILITY METRIC OR METRICS

BACKGROUND

The present disclosure generally addresses data backup scheduling, and more particularly, relates to ADAPTIVE DATA BACKUP SCHEDULING BASED ON RELIABILITY METRIC.

This disclosure, and the embodiments described herein adaptively modify a schedule for backing up data.

INCORPORATION BY REFERENCE

U.S. patent application Ser. No. 16/402,949 by Stuart Mark filed May 3, 2019, and entitled "METHODS AND SYSTEMS TO TRACK KERNEL CALLS USING A DISASSEMBLER";

U.S. Pat. No. 9,645,891 by Ahn et al., issued May 9, 2017 and entitled "OPPORTUNISTIC EXECUTION OF SECONDARY COPY OPERATIONS";

U.S. Pat. No. 7,246,207 by Kottomtharayil et al., issued on Jul. 17, 2007 and entitled "SYSTEM AND METHOD FOR DYNAMICALLY PERFORMING STORAGE OPERATIONS IN A COMPUTER NETWORK";

U.S. Pat. No. 9,229,818 by Doshi et al., issued on Jan. 5, 2016 and entitled "ADAPTIVE RETENTION FOR BACKUP DATA";

U.S. Patent Publication No. 2016/0162374 by Mutha et al., published on Jun. 9, 2016 and entitled "SECONDARY STORAGE EDITOR";

U.S. Patent Publication No. 2018/0088825 by Mutha et al., published on Mar. 29, 2018 and entitled "DEFENSIBLE PRUNING";

U.S. Patent Publication No. 2016/0162364 by Mutha et al., published on Jun. 9, 2016 and entitled "SECONDARY STORAGE PRUNING";

U.S. Pat. No. 8,805,806 by Amarendran et al., issued on Aug. 12, 2014 and entitled "AUTOMATED, TIERED DATA RETENTION";

U.S. Pat. No. 8,799,245 by Amarendran et al., issued on Aug. 5, 2014 and entitled "AUTOMATED, TIERED DATA RETENTION".

U.S. Patent Publication No. 2018/0006870 by McChord, published on Jan. 4, 2018 and entitled "REMOTELY CONFIGURABLE ROUTERS WITH FAILOVER FEATURES, AND METHODS AND APPARATUS FOR RELIABLE WEB-BASED ADMINISTRATION OF SAME".

BRIEF DESCRIPTION

In one embodiment of this disclosure, described is a processor implemented method for adaptive scheduling and performing data backups of protected data, the protected data being received from a protected computing device operatively associated with a backup computing device, the method comprising: receiving a nominal backup schedule that indicates times for backing up the protected data; determining that a time differential between the nominal backup schedule and a current time metric is greater than a threshold; in response to the determination that the time differential is greater than the threshold, modifying the backup schedule so that times indicated in the modified backup schedule are at a higher frequency than a frequency of the indicated times of the nominal backup schedule; and performing a backup of the protected data using the modified backup schedule.

In another embodiment of this disclosure, described is a backup system for adaptive scheduling and performing data backups of protected data following an offline period, the system comprising: at least one processor; and at least one memory including computer program code; the at least one memory and the computer program code configured to, with the at least one processor, cause the system at least to: receive a nominal backup schedule that indicates times for backing up the protected data; determine a time differential between the nominal backup schedule and a current time metric when the protected data is resumed online; compare the time differential to a threshold; if the time differential is greater than the threshold, modify the nominal backup schedule so that times indicated in the modified backup schedule are at a higher frequency than a frequency of the indicated times of the nominal backup schedule; and perform a backup of the protected data.

In still another embodiment of this disclosure, described is a processor implemented method for adaptive scheduling and performing data backups of protected data, comprising: receiving a nominal backup schedule that indicates times for backing up the protected data; receiving a signal associated with a reliability metric; determining that the reliability metric is greater than a corresponding threshold; and in response to the determination that the reliability metric is greater than the corresponding threshold: (i) modifying the backup schedule so that times indicated in the modified backup schedule are at a higher frequency than a frequency of the indicated times of the nominal backup schedule; and (ii) performing a backup of the protected data using the modified backup schedule.

In still another embodiment of this disclosure, described is a backup system for adaptive scheduling and performing data backups of protected data following an offline period, the system comprising: at least one processor; and at least one memory including computer program code; the at least one memory and the computer program code configured to, with the at least one processor, cause the system at least to: receive a nominal backup schedule that indicates times for backing up the protected data; receive a signal associated with a reliability metric; if the reliability metric is greater than a corresponding threshold: (i) modify the backup schedule so that times indicated in the modified backup schedule are at a higher frequency than a frequency of the indicated times of the nominal backup schedule; and (ii) perform a backup of the protected data using the modified backup schedule; and if the reliability metric is not greater than the corresponding threshold, perform a backup of the protected data using the nominal backup schedule.

BRIEF DESCRIPTION OF THE DRAWINGS

FIG. 5A shows an example of a nominal N-older policy with no skipped backups.

FIG. 5B shows an example of a nominal N-older policy with skipped backups $T_0$-6 through $T_0$-2.

FIG. 5C shows an example of improved N-retained policy with missing backups $T_0$-6 through $T_0$-2.

FIG. 6A illustrates an example of a nominal retention policy showing first period frequency and second period frequency.

FIG. 6B illustrates an example of a nominal policy with missing backups.

FIG. 6C illustrates an example of an improved policy with minimum number of high frequency backups.

FIG. 6D illustrates an example of an improved policy with minimum number of backup segments.

DETAILED DESCRIPTION

In today's environment, a robust data backup system is important to many companies and businesses. Particularly, losing critical data can be detrimental or even fatal to may companies. One way to ensure robustness is to always take very frequent backups. However, this is quite expensive, and further is memory intensive. It is thus desirable to create an optimal schedule for creating backups, and also for pruning unneeded backups.

In this regard, certain risk factors can contribute to unreliable data backup. For example, consider the situation of data from a protected computing device being backed up on a backup computing device. If the system becomes offline (e.g., the protected computing device stops communicating with the backup computing device), there may be an extended period of no backup or little backup. This may be problematic if a restore is needed. For example, if no data at all is available from the offline period, the data may be lost. In another example, there is always the possibility than a backup is corrupt. In this regard, consider one example where the protected device is a laptop that has been offline while the user works on the laptop for some period of time (e.g., a week). The first back up when the laptop comes back online contains a lot of information. If that backup is corrupted in some way, that information could be lost. To handle this, some embodiments take backups more frequently when the protected device comes back online. So, if that first backup is corrupt, there will be another backup from a time that is closer in time than the nominal schedule would dictate. Further in this regard, some exemplary embodiments of the present disclosure address this problem by changing a backup schedule or a pruning schedule specifically around a time period of unreliability.

A system's location can also affect reliability. For example, if a protected computing device's Wi-Fi access is poor, transmission to the backup computing device is compromised, and the data backup could be corrupted. Furthermore, a poor Wi-Fi connection (or poor connection through cellular communication, blue tooth, etc.) can lead to less frequent backup, which leads to fewer recovery points, which is less robust than having the nominal number of recovery points. In yet another example, the physical or environmental conditions such as power fluctuation, room/equipment temperature, humidity, vibration, weather forecast (e.g., lightning, high winds, heavy rain), and nearby construction can affect reliability. For example, these conditions can corrupt a transmitted backup.

Further regarding data backup systems, it should be understood that data backups are periodically pruned to save memory. In this regard, too frequent pruning around a period of unreliability can lead to a critical loss of data in the event that a backup is needed but has already been pruned.

Figure 1A:
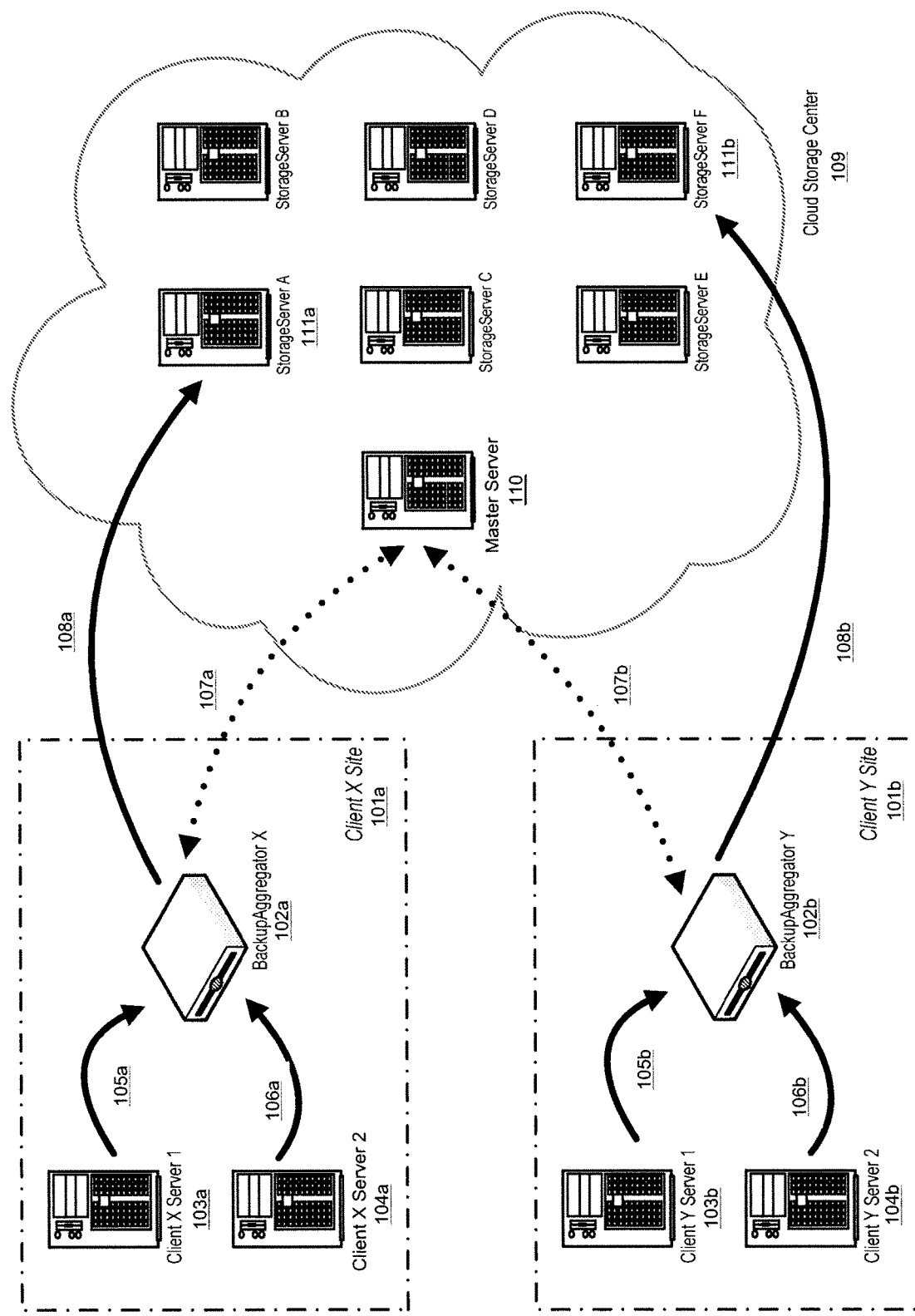
FIG. 1A shows a block diagram of a backup network system including a local Backup Aggregator according to an exemplary embodiment of this disclosure. This exemplary system may be configured to implement methods of, for example, adaptive scheduling, adaptive backup, or adaptive pruning.

The present disclosure addresses the above-mentioned problems and others. In this regard, FIG. 1A illustrates one exemplary backup system according to this disclosure. As shown in FIG. 1A, the Backup Disaster Recovery (BDR) network provides an image-based backup solution wherein a local device(s), e.g., backup aggregators 102a and 102b, are responsible for and facilitate the aggregation of image-based backups from a plurality of client devices 103a, 104a, 103b, 104b local to and/or in communication with the backup aggregators 102a and 102b. For example, in one embodiment, a given BDR client site, e.g., 101a and 101b, may have one or more backup aggregators in communication on a local area network. Client devices, which may be servers, workstations, laptops, and/or the like, e.g., 103a, 104a, 103b, 104b may also be in communication with backup aggregators 102a and 102b on a local area network 105a, 106a, 105b, 106b and periodically transfer a representation of a block level storage device to backup aggregators 102a and 102b. The backup aggregator may thereafter generate a snapshot of the received image backup file(s) according to a local backup schedule. The snapshot operation may be server specific, such as for example a local backup snapshot policy that generates hourly backups for a mission-critical mail server while only generating daily snapshots of image backup files from a user's laptop. The BDR may also be configured such that the transfer of image-based backup files from client devices (such as servers, workstations, laptops, etc. described above) may differ from the local snapshot policy itself.

According to an embodiment, backup aggregators 102a and 102b may maintain such a local backup policy while additionally maintaining a remote backup policy. The remote backup policy may be a backup policy maintained at the backup aggregator that determines how frequently the backup aggregator will synchronize certain image-based backup file snapshot data with remote cloud storage center 109 via one or more of communication networks 107a, 107b, 108a and 108b. In one embodiment, backup aggregator 102a may coordinate the execution of its remote backup schedule with a master server 110. The master server may receive from the backup aggregator an indication of the backup aggregator's last known storage server pairing within the cloud storage center 109. A storage server, for example StorageServer A 111a, may be a server that is directly paired with the backup aggregator such that is capable of receiving and applying to its own snapshot capable file system a received send file representing the file system differences between image-based file backups snapshotted at two different points in time.

After coordinating with master server 110, backup aggregator 102a may thereafter initiate a send file transfer operation, e.g., 108a, with its paired storage server 111a within the cloud storage center. In some embodiments, storage server 111a may itself have a paired or file system mirroring relationship with a second storage server. Such a BDR configuration may be useful in cases where the image-based backup snapshot history maintained on the backup aggregator would be advantageously stored on both the backup aggregator's paired server, e.g., 111a, and a secondary storage server located in a different geographical location. Such a configuration may enable recovery of cloud storage center stored image snapshot data even in scenarios where cloud storage center 109 is completely destroyed.

Furthermore, in some embodiments, the master server 110 may direct the activity of multiple backup aggregators as well as manage or direct the pairing of backup aggregators 102a, 102b with different storage server nodes (e.g., StorageServers A-F, 111A, 111B) within cloud storage center 109. It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

Figure 1B:
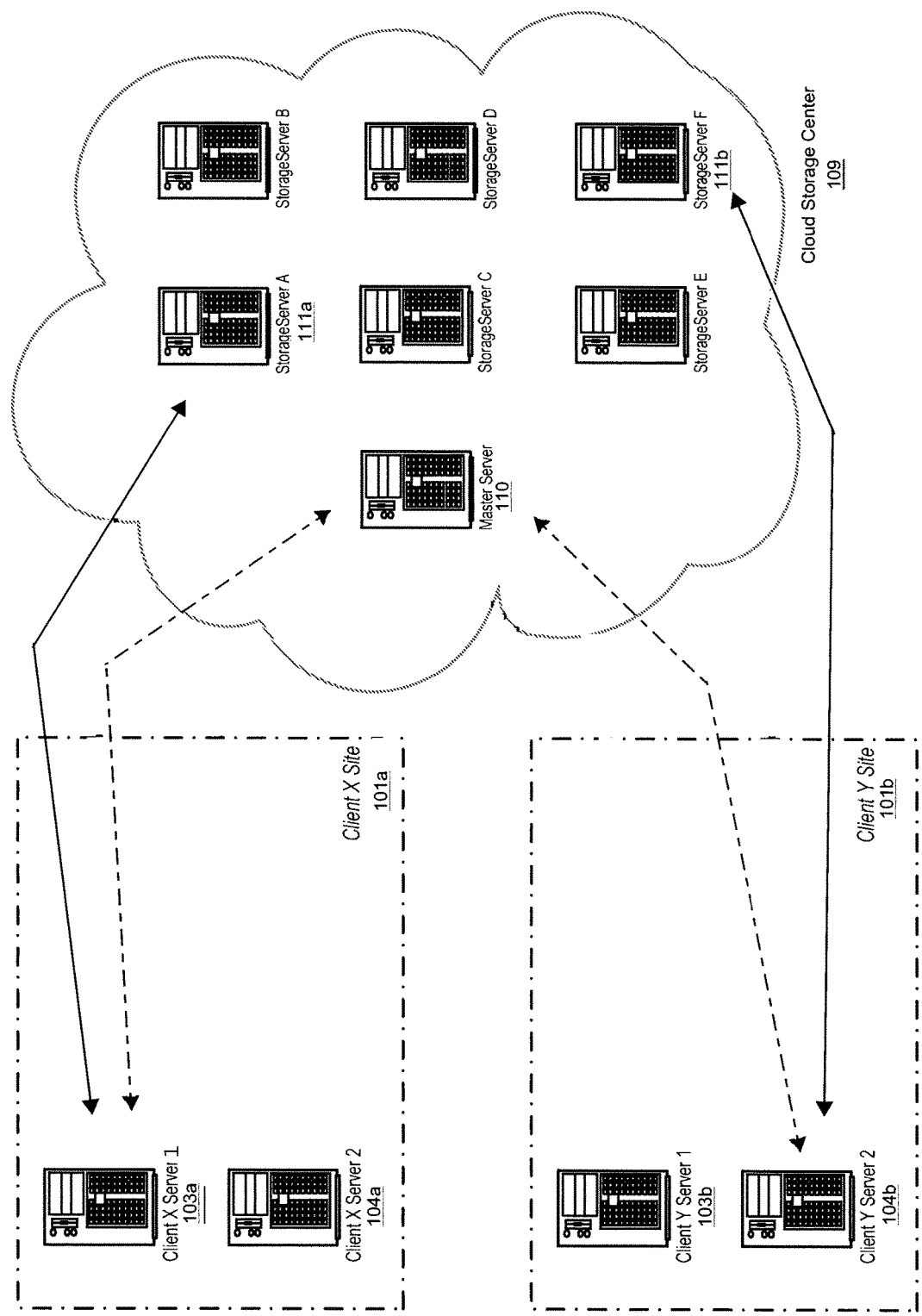
FIG. 1B shows a block diagram of a backup network system without a local Backup Aggregator according to an exemplary embodiment of this disclosure. This exemplary system may be configured to implement methods of, for example, adaptive scheduling, adaptive backup, or adaptive pruning.

With reference to FIG. 1B, a block diagram is shown of a backup network system without a local Backup Aggregator according to an exemplary embodiment of this disclosure.

As shown, client servers 103a, 104a, 103b and 104b communicate directly with the master server 110 associated with cloud storage center 109. According to an exemplary embodiment, the backup aggregator functionality previously described with reference to FIG. 1A is performed by master server 110. In this regard, it should be understood that the backup scheduling and/or pruning may occur at either or both of the backup aggregators 102a, 102b or devices within the cloud storage center (e.g., StorageServers A-F, 111A, 111B, master server 110).

In addition, in some embodiments, different types of backups may be performed. For example, different types of backups include: full, incremental, and differential. As used herein, unless the type of backup (full, incremental, or differential) is specified, a "backup" may refer to any of a full backup, an incremental backup, a differential backup, or any other type of backup whether or not that type of backup is described in this disclosure.

Full backups make a complete copy of all data. Advantageously, a full backup leads to a minimal time to restore data. However, a drawback of a full backup is that it takes longer to perform a full backup than other types of backups, and further requires more storage space.

An incremental backup is a backup that copies only the data that has changed since the last backup of any type (e.g., full, incremental, or differential). A modified time stamp on files is sometimes compared to a time stamp of the last backup. In this way, backup applications track and record the date and time that backups occur in order to track files modified since these backups. An incremental backup only copies data since the last backup of any type. A benefit of an incremental backup is that it copies a smaller amount of data than a full backup, and therefore the incremental backup completes faster and requires less storage space.

A differential backup, the first time it is performed, copies all data changed from the previous backup. In this way, the differential backup is similar to the incremental backup. However, each subsequent differential backup copies all data changed since the previous full backup. The subsequent differential backups accordingly store more data than incremental backups, although the subsequent differential backups typically still store far less than a full backup. Therefore, differential backups require more storage space and time to complete than incremental backups, but less than full backups.

In some embodiments, a backup schedule includes times when these different types of backups are performed. For instance, a full backup may be performed once in the evening, and incremental backups or differential backups are taken hourly. In another example, full backups may be taken weekly and incremental backups or differential backups are taken daily. However, certain risk factors can contribute to unreliable data backup. For example, a system being offline could lead to an extended period of no backup, resulting in little data history, which may be problematic if a restore is needed (e.g., it is not reliable to depend on one backup snapshot or one backup of files). In another example, a system's location can affect reliability. For example, hotel Wi-Fi could be poor leading to no signal or poor signal so that, during backup, transmission to a data repository is compromised and the data backup could be corrupted. Furthermore, a poor Wi-Fi connection (or poor connection through cellular communication, blue tooth, etc.) can lead to less frequent backup, which leads to fewer recovery points, which is less robust than having the nominal number of recovery points. In yet another example, the physical or environmental conditions such as power fluctuation, room/equipment temperature, humidity, vibration, weather forecast (e.g., lightning, high winds, heavy rain), and nearby construction can affect reliability. For example, these conditions can corrupt a transmitted backup.

The systems and methods of adaptive scheduling disclosed herein are used to create robustness in a process for backing up a computing device. In some embodiments, the scheduling method increases robustness, where it performs backups at a higher than nominal frequency when the protected device has been offline for a certain period of time. For example, in a situation where backups are normally retained for two weeks and the protected device has been active, but offline (e.g., has no active data transmission connection with a data repository) for more than two weeks. No backups will be available for a restore for the time period while the device was offline. In addition, in another example, there is the possibility than a backup is corrupt. In this regard, consider one example where the protected device is a laptop that has been offline while the user works on the laptop for some period of time (e.g., a week). The first back up when the laptop comes back online contains a lot of information. If that backup is corrupted in some way, that information could be lost. To handle this, some embodiments take backups more frequently when the protected device comes back online. So, if that first backup is corrupt, there will be another backup from a time that is closer in time than the nominal schedule would dictate.

In other embodiments, the scheduling method can be more proactive, where it increases the frequency of backup when certain risk factors are present. In some embodiments, additional backup verifications can be performed. Backup can be data-block- or file-based and applied to client computing devices, servers, volumes or sections of volumes.

To further explain the verification aspects, in the data backup filed, backups are sometimes tested to make sure they are valid. A backup disk image can be booted up on another computing device(s) (e.g. a verification device). Passing the validity test (e.g. "verification") can include a successful boot, successfully loading certain applications, ability to read certain files and so forth.

In addition, data backup is usually scheduled for fixed times, such as when the system is most quiescent and the backup will be less likely to interfere with normal processing. Fixed scheduling does not optimize a recovery point (time) under certain risk scenarios. Data backups can be missed for an extended period during which significant changes were made to data, and also backups can be corrupted by various processes, such as transmission errors, "bit rot", and maleficence. The adaptive data backup schedule of the systems and methods described herein based on a reliability metric or metrics can address these and other shortcomings in the data backup and restore process.

In some situations, it can be advantageous for data backup to be performed at a higher than nominally scheduled frequency, such as when the protected device has been offline for a certain period of time; for example, in the situation of when backups of a protected device are scheduled to be performed once per day and the device has been disconnected from the backup network for a week while the user continued to use the device and changed a significant amount of data on the device. If the device crashes after the first backup, restoration of that significant amount of data is dependent on that single backup. That single backup could be corrupted through various processes as mentioned above, and the restoration may not be adequate. In an embodiment of the adaptive data backup scheduling method as disclosed herein, the frequency of the backups is increased if the protected device was offline for an extended period. That approach quickly creates multiple backups, which is more robust for accurate restoration than having one or very few.

In one aspect of the present disclosure, there is a proactive adaptive scheduling described herein that also improves Recovery Point Objective (RPO) (e.g., the age of files that is required be retrieved from backup storage for normal operations to resume if a device fails).

A protected computing device (e.g., a device that is having data backed up) could encounter various conditions that can increase the probability of the device failing or data being lost. In some embodiments, when these conditions are encountered, a signal identifying or quantifying the condition can trigger a backup as well as modify a backup schedule to have increased frequency.

The following will describe some example reliability metrics.

One reliability metric is the weather. For example, high winds, lightning, heavy rain can cause power outages and breaks in data transmission. Signals corresponding to a weather metric may be derived from local weather forecasts. The forecasts can be pulled off of any of a number of feeds. The forecasts can come from a weather forecast service provider (e.g., NOAA, AccuWeather, . . . ) or from local sensors (e.g., commercially available weather stations). In this regard, some weather services (e.g. NOAA) provide graduated alerts.

The metrics may be compared to thresholds. In one example, the thresholds can be set based on an experience (history). For example, power or connectivity failure may happen with a certain probably if rain or wind (or the combination) reaches a certain level. For instance, the probability of an outage may be:

10% for 20 mph winds,
20% for 30 mph winds,
30% for 40 mph winds,
50% for 50 mph winds,
90% for 60 mph winds, and
100% for 70 mph winds.

The historical trends can be associated with reliability and the thresholds can be determined based on the degree of acceptable risk. For example, for critical data, 5% chance of outage may be a threshold, while less important data and systems may be able to tolerate 30% risk. Cost can also be a factor. If the cost to perform a backup is high, that may increase the thresholds.

These numbers are simply examples. They can be determined from local experience at a given site or from broader geographic data. Wind-based metric can factor in how long the wind speed is maintained for. That is, data on either or both gusts and sustained winds can be used to determine the reliability.

Rain and lightning metrics are analogous. A site can generate a history profile of outages versus levels or rain or intensity, frequency, proximity of lightning strikes. The history profile is associated with the reliability metric and the threshold is determined as described above.

Another reliability metric is a location or geolocation of the protected computing device or the backup computing device. Certain locations can be susceptible to poor transmission and power outages (e.g., cities/towns with poor power infrastructure, hotels with intermittent Wi-Fi). Corresponding signals for this metric may be derived from, for example, GPS data, Wi-Fi data, and/or an IP address (e.g. IP addresses can be associated with a geolocation). For example, Google has a database of WiFi networks and their physical location. So, using Google while traveling provides the user with local information. Similar databases, along with performance metrics (dropped data packets, bandwidth, . . . ) for the networks can be used as reliability metrics. In addition, geolocation can also be achieved using triangulation from cell towers when the device is capable of receiving cellular signals. For example, iPad and some laptops are now LTE capable. Alternatively, a cell phone connected to a computer with a suitable software agent can relay the cellular signals geolocation to the computer.

Another reliability metric is the ambient conditions of either the protected computing device or the backup computing device. For example, room/equipment temperature, humidity/dampness, vibration can all effect reliability. Corresponding signals for this metric may be derived from sensors. Many sensors are available to detect these factors and transmit (e.g., smart thermostats, SmartThings®, . . . ). Computing equipment and spinning disks are specified to operate well under certain ambient conditions. When the sensed condition is outside of the operating specification, a signal of high unreliability can be generated.

Another reliability metric is an activity near either the protected computing device or the backup computing device. For example, construction (e.g., local along the power/network line) may be useful as a reliability metric. Corresponding signals for this metric include a user input, and power outage alerts.

For determining a backup schedule or a pruning schedule, any of the reliability metrics may be used on their own or in combination with another reliability metric. When the reliability metrics are used in combination with one another, each of the reliability metrics may be given equal weight or different weights.

Figure 2A:
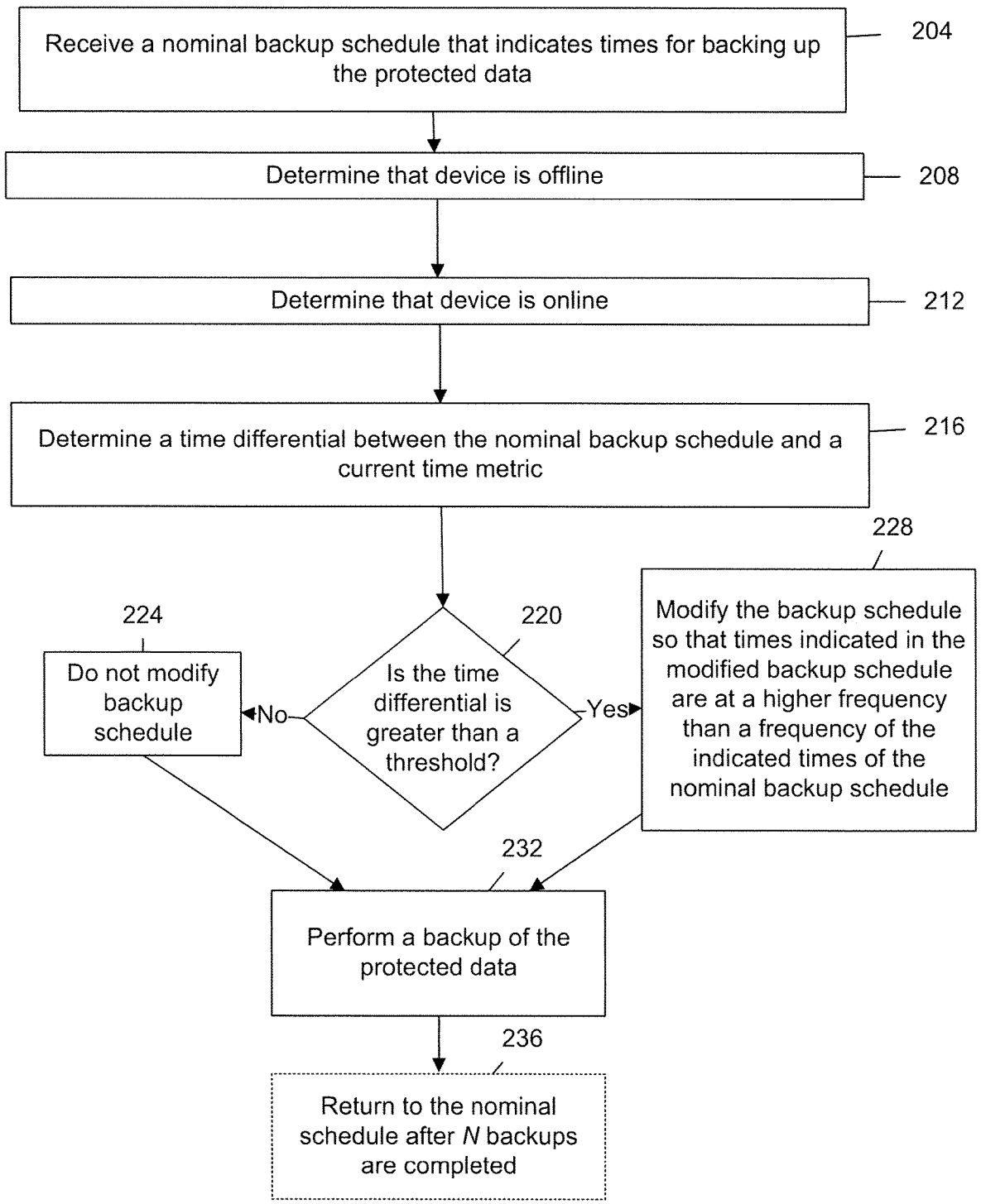
FIG. 2A is a flow chart of a method relating to backup after an offline period according to an exemplary embodiment.

FIG. 2A illustrates an embodiment relating to backup after an offline period. At step 204, a nominal backup schedule is received that indicates times for backing up the protected data. Thereafter, at step 208, it is determined that the device is offline; and, at step 212, it is determined that the device is online again. Various tests for determining whether a computer is online are contemplated. For example, a period ping test may be used. In addition, there are various ways to determine if a computer is on or off; for example, computers have event logs that may be accessed in various ways. Another option is to monitor for a check-in signal coming from a backup agent running on the protected device. Yet another option is to create an integration with a managed power solution and to check if the server is drawing electricity. In some embodiments, the device being "offline" does not mean the server being down, but rather means an application being down (thus, an application being down leads to a higher backup frequency). For example, if an SQL Server instance crashed multiple times, it is beneficial to have more frequent backups of the server on which SQL Server was running. That way, if the SQL server instance crashed again, the backup system is more likely to have a closer recovery point and so would have lost less data.

At step 216, a time differential between the nominal backup schedule and a current time metric is determined. At step 220, the time differential between the nominal backup schedule and a current time metric is determined and compared to a threshold. If the time differential is less than the threshold, at step 224, the backup schedule is not modified. If the time differential is greater than the threshold, at step 228, the backup schedule is modified so that times indicated in the modified backup schedule are at a higher frequency than a frequency of the indicated times of the nominal backup schedule. Further regarding the threshold, in some embodiments, when the compute backup is considered critical (e.g., involving important data that might change often), the threshold can be small compared to the intervals between backups. For instance, if the computer was offline for more than 5% of a backup interval, modify the schedule; and for less critical data, the threshold can be near the full interval and possible the length of several intervals. (1, 2, 3 . . . )

At step 232, the backup of the protected data is performed. At step 236, the nominal schedule is returned to after N backups are completed (this step is optional and is only performed if the time differential was greater than the threshold). In some embodiments, N is the number of backups required to result in the same number of backups as if none were missed. In some embodiments, a more robust approach considers the time around the offline period to be a period of unreliability. Given that assumption, it can be desirable for N to be larger than a number to catch up to the nominal number of backups. It may be set to give two or three times as many backups over a time period (such as a few hours to a few days) compared to the nominal number of backups.

In addition, consider the following example, which assumes a connection that intermittently fails. Over some period of time, for example a day, the connection is broken many times, and the shortest continuous connection time is 15 minutes. In this case, some disclosed embodiments increase the backup frequency to capture a backup at least every 15 minutes, thus resulting in a backup during an intermittent up time.

As an alternative to using the absolute shortest time, a distribution of online times may be used. For example, online times that are short outliers can be eliminated from the choice. Alternatively, shortest intervals (e.g. 5%, 10% and so forth) as the frequency may be used.

Figure 2B:
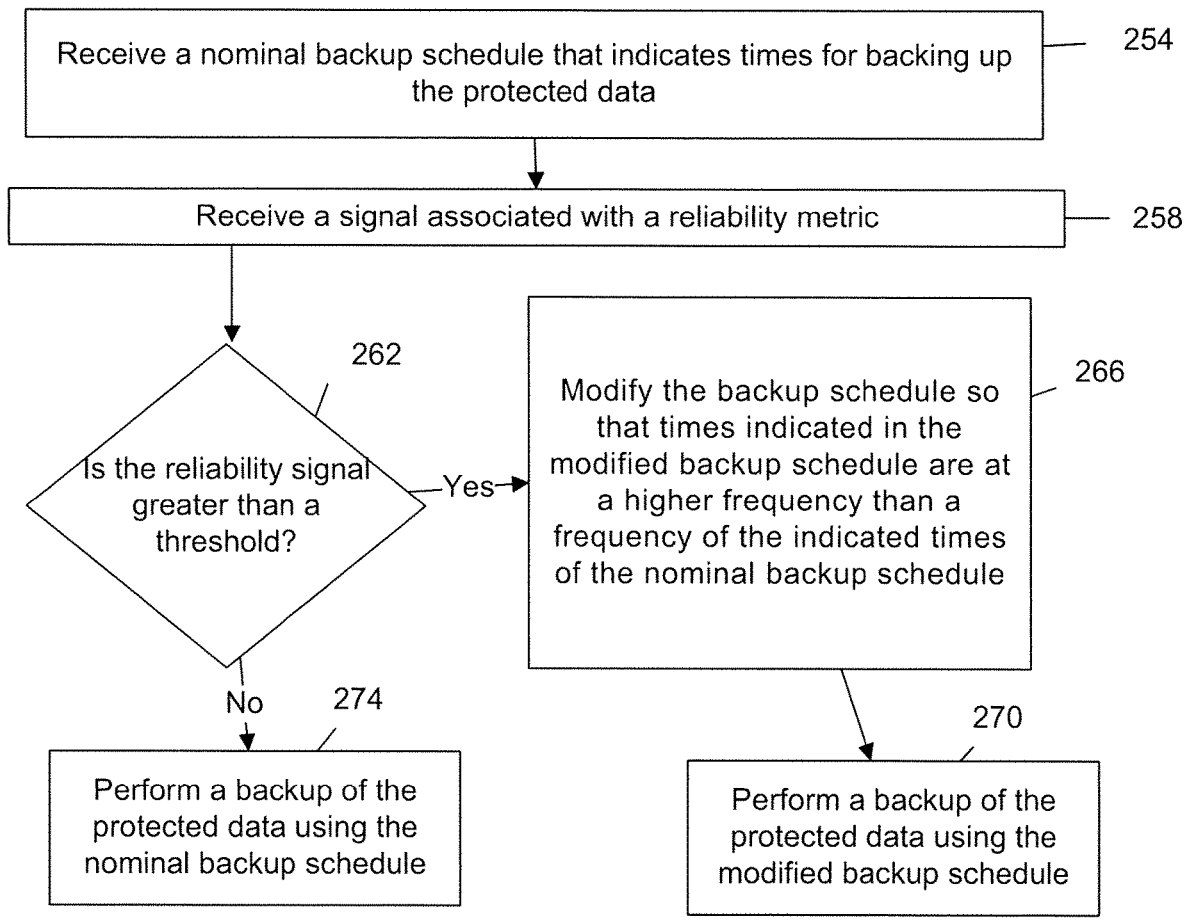
FIG. 2B is a flow chart of a method relating to using a reliability metric in scheduling according to an exemplary embodiment.

FIG. 2B illustrates an embodiment relating to using a reliability metric in scheduling. At step 254, a nominal backup schedule is received that indicates times for backing up the protected data. Thereafter, at step 258, a signal associated with a reliability metric is received. At step 262, it is determined if the reliability metric is greater than a threshold. If so, at step 266, the backup schedule is modified so that times indicated in the modified backup schedule are at a higher frequency than a frequency of the indicated times of the nominal backup schedule. Thereafter, at step 270, a backup of the protected data using the modified backup schedule is performed. If the reliability metric is not greater than the threshold, a backup of the protected data using the nominal backup schedule is performed at step 274.

In alternative embodiments, if the reliability metric(s) are less than a second threshold, the backup schedule is modified so that times indicated in the modified backup schedule are at a lower frequency than a frequency of the indicated times of the nominal backup schedule.

In addition to the scheduling aspects, improving data retention aspects of a backup system can increase system robustness. For example, an improved data retention policy reduces the risk of losing backup data that might be needed.

Particularly, as described herein, an adaptive retention policy may be used to create robustness as part of a process for backing up a protected computing device. Rollup and retention are contingent on a set of rules based on when the machine was last backed up, or the number or times of recent backups. Additionally, it can also be based on a reliability metric(s). Additional verifications on one or more retained backup(s) can be performed prior to deleting other backups. Backup can be data-, block- or file-based and applied to client computing devices, servers, volumes or sections of volumes. Metadata can be included with a backup that indicates any reliability metric present while the backup was taken.

Advantageously, the systems and methods described herein improve the following features of a data retention policy: "local" or "easy access" retention versus "offsite" or "long term" archived retention; roll-up; data importance; legal compliance requirements; and customer compliance requirements.

The following will describe adaptive data retention based on reliability metrics; it should be understood that all previously described reliability metrics, missed backups/check-ins and so forth may be to adaptive retention and vice versa. Particularly, in some situations, it can be advantageous for the data backup retention process to extend the duration and/or frequency of retained backups. In this regard, consider two embodiments. In one embodiment, a data retention schedule is modified based on missed backups. In another embodiment, a data retention schedule is modified based on signals, such as percent successful check-ins; this embodiment can be generalized by having the signal be success/nonsuccess of a backup, but, for clarity, the two embodiments will be described separately. In some embodiments, the check-ins may be from a check-in signal coming from a backup agent running on the protected device. In some embodiments, the check-ins are associated with the router connection to the protected device or to the backup device. (Routers have heartbeat—see U.S. Patent Publication No. 2018/0006870 by McChord).

Figure 3:
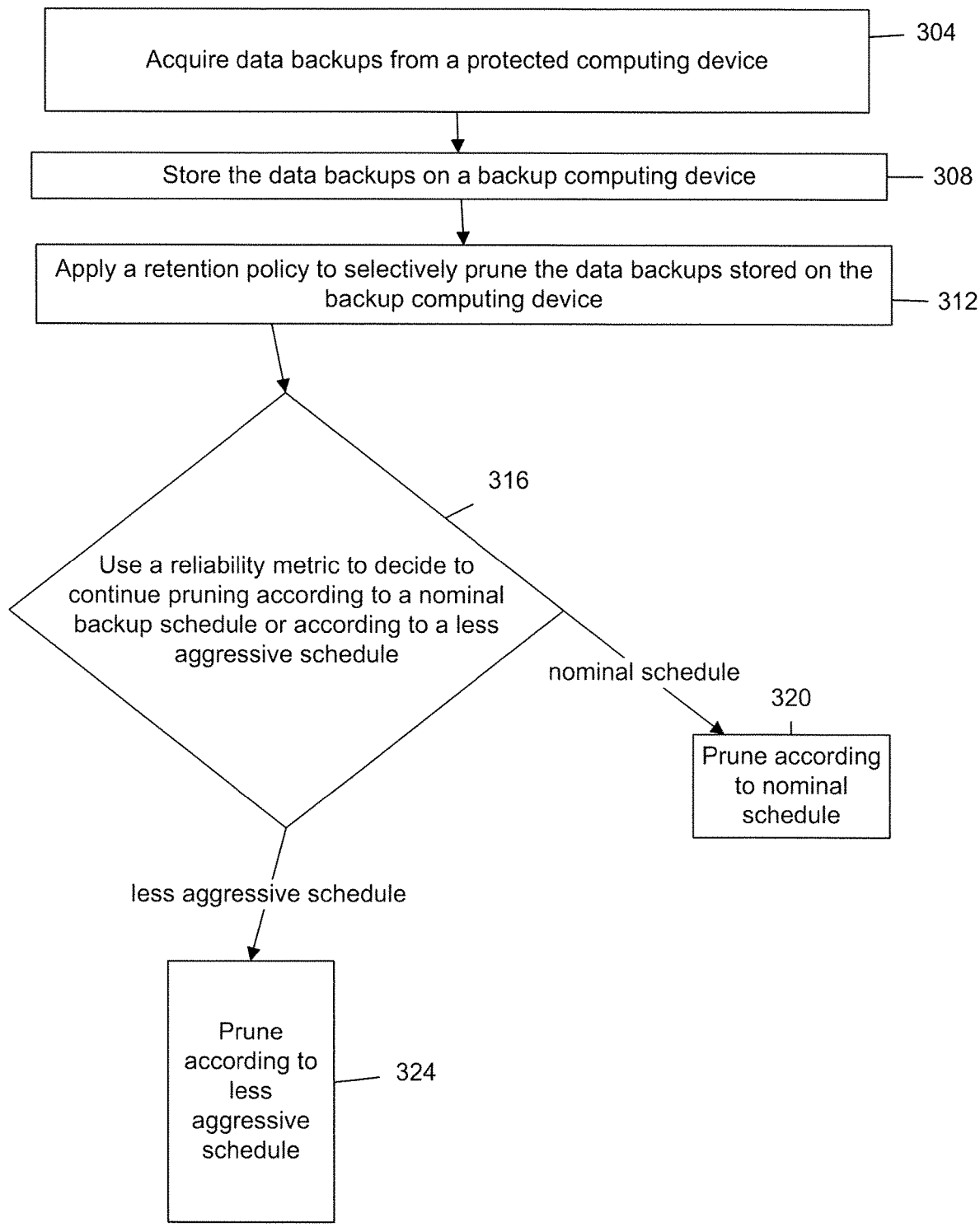
FIG. 3. is a flow chart of a method relating to modified retention based on missed backups according to an exemplary embodiment.

FIG. 3. illustrates an example embodiment relating to modified retention based on missed backups. At step 304, data backups are acquired from a protected computing device. At step 308, the data backups are stored on a backup computing device. At step 312, a retention policy is applied to selectively prune the data backups stored on the backup computing device. At step 316, a reliability metric is used to decide to continue pruning according to a nominal backup schedule or according to a less aggressive schedule. If it is decided to prune according to the nominal schedule, the method proceeds to step 320. If it is decided to prune according to the less aggressive schedule, the method proceeds to step 324.

In this regard, it should be noted that a greater than nominal number of data backups includes higher density (e.g., more frequent in time) or a greater overall number of data backups than if the nominal schedule was followed. Further, the reliability metric may include missing scheduled backups of the protected computing device, where the missing scheduled backups are possibly due to one or both of the protected computing device and backup computing device being offline. Still further, the reliability metric may include check-in failures between the protected computing device and the backup computing device.

In alternative embodiments, if the reliability metric(s) are less than a second predetermined threshold, a more aggressive pruning schedule than the nominal schedule may be used.

In addition, the reliability metric can be an address or connection that is different from the nominal address or connection. In this regard, offsite or location dependence (e.g., hotel Wi-Fi) can be poor, and a lack of signal can result in less frequent backup. Such a poor signal can possibly corrupt a transmitted backup. Less frequent backup gives fewer recovery points, which results in a less robust system compared to a system having the nominal set of backups. Further, the reliability metric can be derived, sensed or received, and can point to an unreliable environmental or physical condition that can possibly corrupt a transmitted backup or corrupt the data state of the protected computing device. Examples of the unreliable environmental or physical condition include power fluctuation, room temperature, equipment temperature, humidity, vibration, weather forecast (e.g., lightning, high winds, heavy rain), nearby construction, and poor signal.

Figure 4:
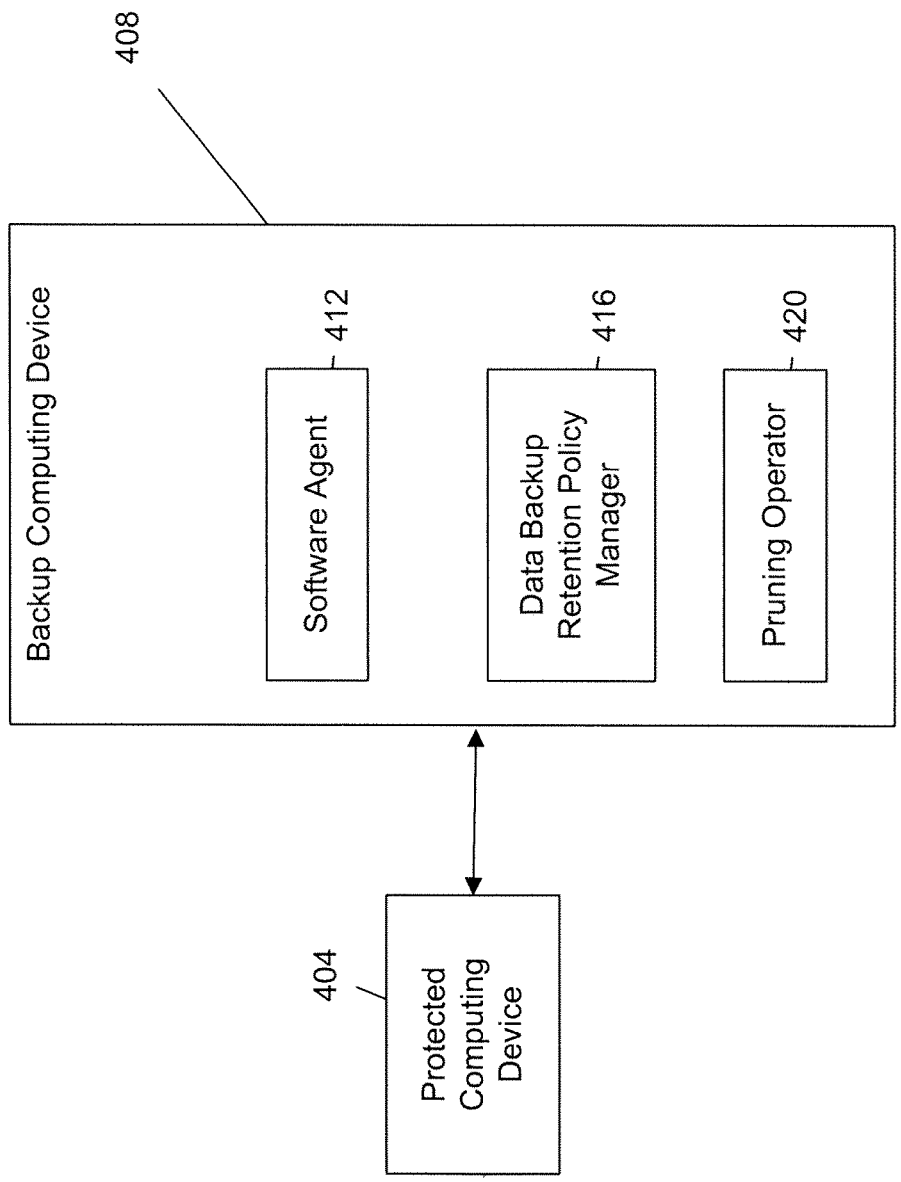
FIG. 4 illustrates an implementation of an exemplary system including a protected computing device operatively associated with a backup computing device. This exemplary system may be configured to implement methods of, for example, adaptive scheduling, adaptive backup, or adaptive pruning.

FIG. 4 illustrates an implementation of a system for applying an adaptive data backup retention policy. With reference thereto, the protected computing device 404 is in communication with the backup computing device 408. The backup computing device includes software agent 412, data backup retention policy manager 416, and pruning operator 420.

FIGS. 5A-5C show backup chains at intervals from $T_0$ to $T_0$-15. Solid vertical lines denote backups. Dashed vertical lines are deleted backups. FIG. 5A shows nominal N-older policy with no skipped backups. In the example of FIG. 5A, the nominal N-older policy deletes backups that are older than the nine most recent backups. It should be understood that deleting backups that are older than the nine most recent backups is merely an illustrative example, and a nominal policy that deletes backups older than any number of backups may be used.

FIG. 5B shows a nominal N-older policy with skipped backups $T_0$-6 through $T_0$-2. The difference between FIGS. 5A and 5B is that in FIG. 5A there had been no skipped backups; whereas, in FIG. 5B, there are skipped backups $T_0$-6 through $T_0$-2. The skipped backups $T_0$-6 through $T_0$-2 may be due to the protected device going through an offline period or for other reasons. In the example of FIG. 5B, the policy resulted in saving only four backups; this has a poor robustness because of possible defects in the backups. For example, if the four backups are corrupted or otherwise unusable and a recovery is necessary, data may be permanently lost. FIG. 5C shows improved N-retained policy with missing backups $T_0$-6 through $T_0$-2. The example of FIG. 5C is more robust than the example of FIG. 5B because more backups are retained (e.g., nine retained backups instead of four).

In addition, some embodiments take the different types of backups into account (e.g., full, incremental and differential). In this regard, in some embodiments, the schedule is modified such that the frequency of full and differential backups is increased. That is, it may make the backup system more robust if coming back online or during an offline period (e.g. as illustrated in $T_0$-6 through $T_0$-2 of FIGS. 5B and 5C) or a period of unreliability, full backups are taken instead of incremental backups. So, following an offline period or period of unreliability, a full backup is taken rather than an incremental (if incremental was specified in the schedule). In the next few backups you can increase the frequency of full backups. They could be at nominal times of incremental backups, or they could be at other times. Put another way, in some embodiments, following an offline period or period of unreliability, times slotted for incremental backups may be replaced by full backups; alternatively, following an offline period or period of unreliability, additional full backups may be scheduled at different times from the nominal times of incremental or differential backups. FIGS. 6A-6D use vertical dashed lines to show deleted backups. Unlike FIGS. 5A-5C which have a nominal policy that simply deletes backups older than a certain number of backups, FIGS. 6A-6C use periods. FIG. 6A illustrates a nominal retention policy showing a first period frequency and a second period frequency. The illustrated example includes an (optional) grouping of backups into segments (e.g., days where the most recent day is represented as "$D_0$" in FIGS. 6A-6D). In the illustrated example, the first period includes $D_0$ through $D_0$-2, and the second period includes $D_0$-3 and $D_0$-4. FIG. 6B illustrates a nominal policy with missing backups; whereas, FIG. 6A did not have any missing backups.

FIG. 6C illustrates an improved policy with a minimum number of high frequency backups. FIG. 6C has the same number of missing backups as FIG. 6B. However, the implementation of FIG. 6C is based on retaining a minimum number of backups, thus resulting in a more robust policy than the implementation of FIG. 6B.

FIG. 6D illustrates an even further improved policy. Specifically, in the example of FIG. 6D, a minimum number of backup segments (rather than just a minimum number of backups) are retained. In the example of FIG. 6D, this includes segments $D_0$-4 and $D_0$-3.

Figure 7A:
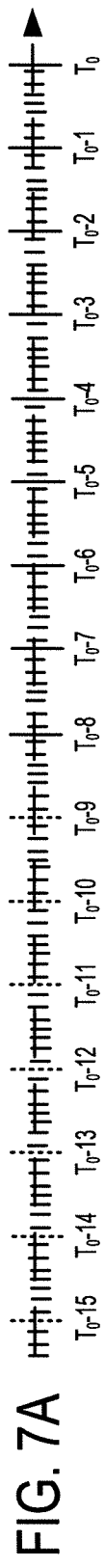
FIGS. 7A-7C show examples of using reliability metrics and decisions to prune less aggressively around a period of unreliability.
Figure 7B:
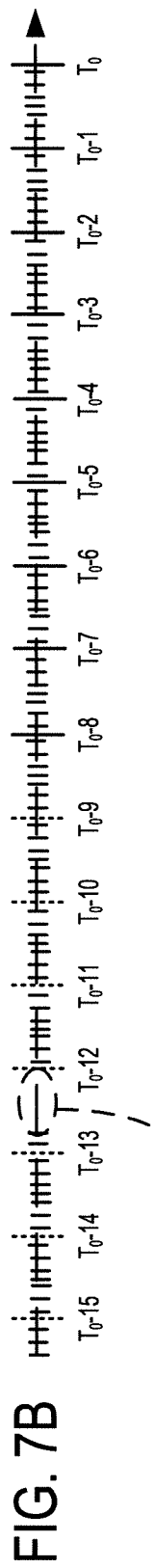
Figure 7C:
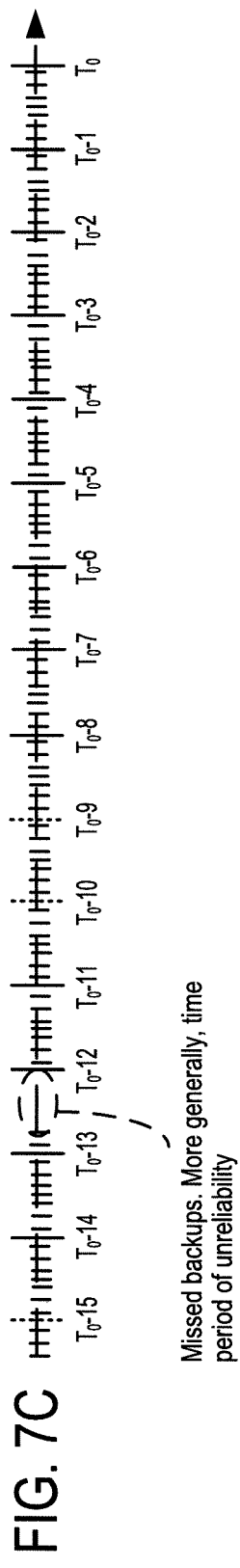

FIGS. 7A-7C show examples of using reliability metrics and decisions to prune less aggressively around a period of unreliability. In FIGS. 7A-7C (as in FIGS. 5A-5C and 6A-6D), vertical dashed lines denote deleted backups. More specifically, FIG. 7A shows nominal N-older policy with no skipped backups. In the example of FIG. 7A, the nominal N-older policy deletes backups that are older than the nine most recent backups. It should be understood that deleting backups that are older than the nine most recent backups is merely an illustrative example, and a nominal policy that deletes backups older than any number of backups may be used.

FIG. 7B shows a nominal N-older policy with skipped backups during the illustrated time period of unreliability. The difference between FIGS. 7A and 7B is that in FIG. 7A there had been no skipped backups; whereas, in FIG. 7B, there are missed backups during the time period of unreliability. In the example of FIG. 7B, the policy deletes backups that are older than the nine most recent backups as in the example of FIG. 7A; this has a poor robustness because of possible defects in the backups. For example, if the backups near the time period of unreliability are corrupted or otherwise unusable and a recovery is necessary, data may be permanently lost. FIG. 7C shows improved N-retained policy with more backups retained near the time period of unreliability. The example of FIG. 7C is more robust than the example of FIG. 7B because more backups are retained.

It should be understood that in the examples of FIGS. 5A-5C, 6A-6D, and 7A-7C, a client computer (e.g., the protected computing device 404 of FIG. 4) is connected to a Business Continuity Disaster Recovery (BCDR) device (e.g., the backup computing device 408 of FIG. 4), either a local appliance or remote server/cloud. The software (e.g., the software agent 412 of FIG. 4) checks a retention policy manager (e.g., data backup retention policy manager 416 of FIG. 4), which is loaded with various retention policies. There can be a policy based on server down time. A software agent installed on server does a check-in with the backup appliance (e.g., the backup computing device 408 of FIG. 4). The backup appliance keeps a record of the check-in attempts. The retention policy manager examines the checks over a period for failed attempts. The attempts could be check-ins or could be attempts to backup. The period could be less than the time between backups and where check-ins are counted, or could extend over multiple backup cycles and check-ins or backup attempts are counted. The manager could be looking for a threshold of successful or unsuccessful check-ins or backups. When considering check-ins, if success is below a threshold, then saved backups are pruned less aggressively. This results in a higher density of backups for forensic or recovery purposes given that there was an indication that there was server downtime around that period. It is desirable to have a higher density of backups around the time of server noncommunication (e.g., server outage).

Figure 8:
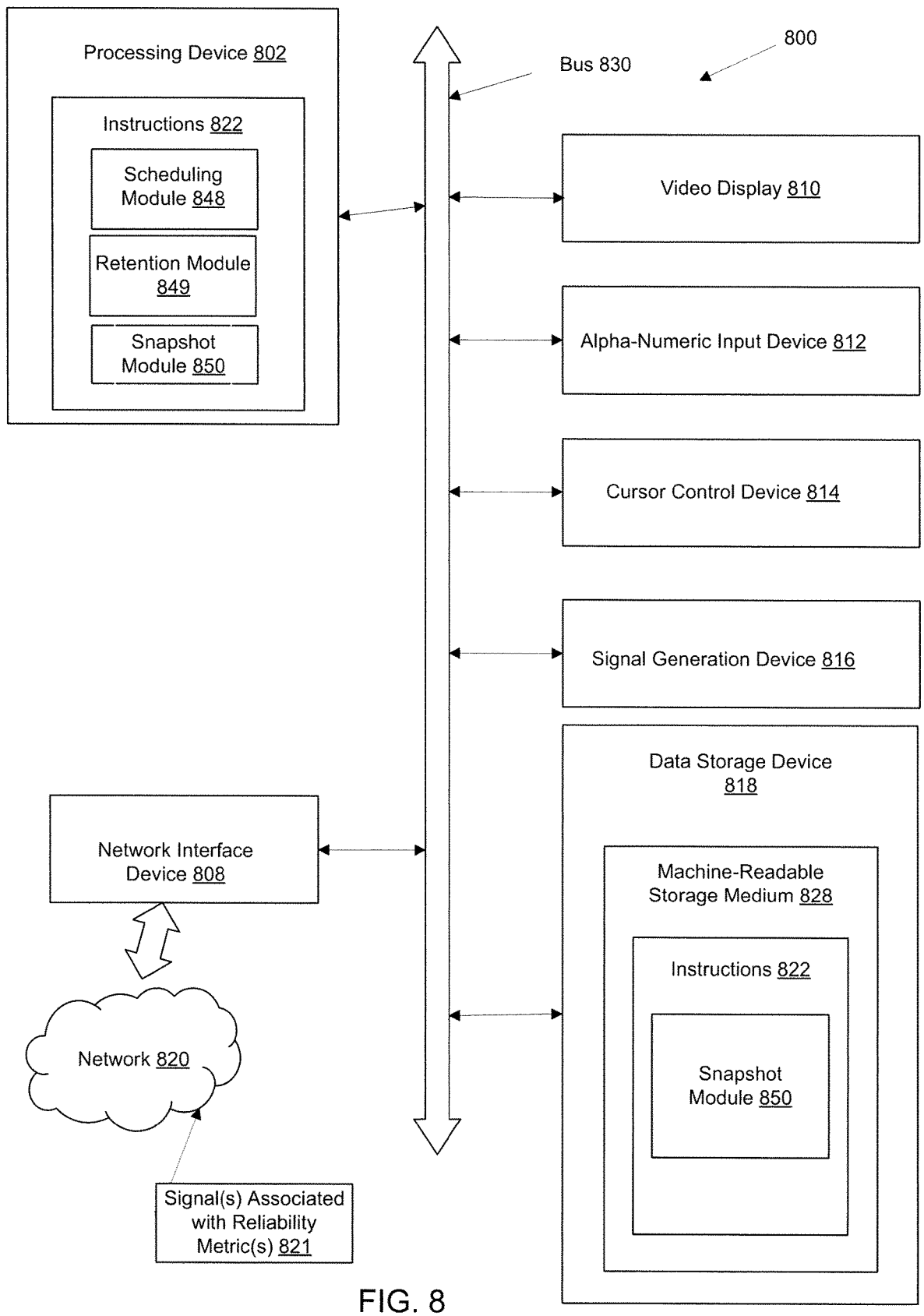
FIG. 8 is an exemplary block diagram of a computer system with a set of instructions to perform methods of, for example adaptive scheduling, adaptive data backup, or adaptive pruning according to exemplary embodiments of this disclosure.

With reference to FIG. 8, a block diagram is shown of a computer system with a set of instructions to perform a backup method according to an embodiment of this disclosure.

FIG. 8 illustrates an example machine of a computer system 800 within which a set of instructions, for causing the machine to perform any one or more of the methodologies discussed herein, may be executed. For example, client devices (e.g., 103a, 104a, 103b, 104b), backup aggregators (e.g., 102a, 102b), master server 110, and/or StorageServers A-F (e.g., 111a, 111b) may be implemented on machines similar to computer system 800. According to various embodiments, the machine may be connected (e.g., networked) to other machines in a LAN, an intranet, an extranet, and/or the Internet. The machine may operate in the capacity of a server (e.g., master server 110) or a client machine (e.g., client devices 103a, 104a, 103b, 104b, or backup aggregators 102a, 102b) in a client-server network environment, or as a peer machine in a peer-to-peer (or distributed) network environment (e.g., StorageServers A-F, e.g., 111a, 111b).

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 800 includes a processing device 802, and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The computing system 800 may further include a network interface device 808, which may be in communication with network 820, which may receive signal(s) associated with reliability metric(s) 821. The computing system 800 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 or software embodying any one or more of the methodologies or functions described herein. The instructions 822 may also reside, completely or at least partially, within the processing device 802 during execution thereof by the computer system 800, and the processing device 802 may also constitute machine-readable storage media.

In one implementation, the instructions 822 include instructions for a scheduling module 848, retention module 849 and snapshot module 850, and/or a software library containing methods that can be called by the scheduling module 848, retention module 849, the snapshot module 850. The machine-readable storage medium 828 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulation of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

Figure 9:
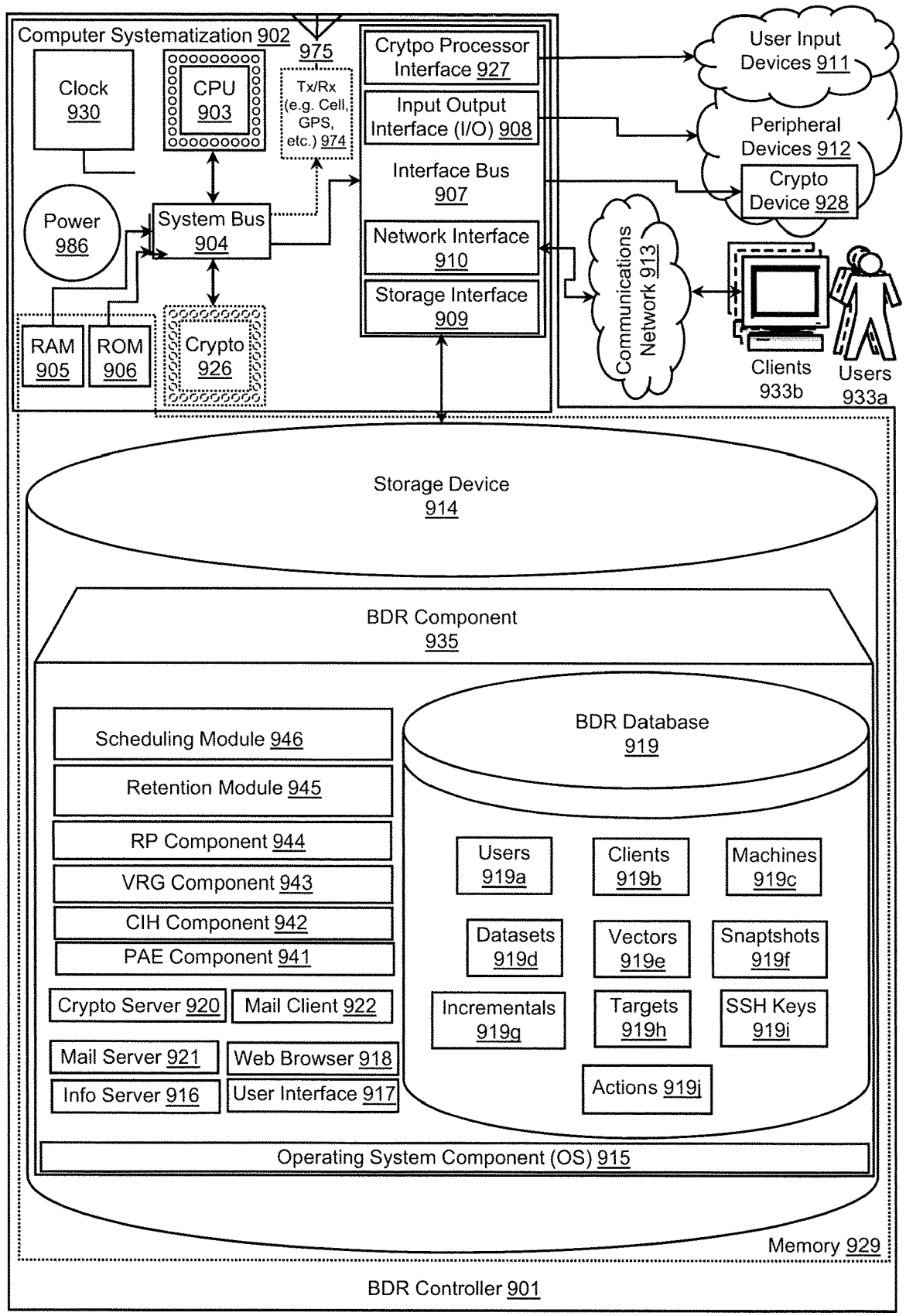
FIG. 9 is a block diagram of a system for managing the replication and storage of data sets associated with one or more client devices including a backup aggregator and operatively associated backup agent running on the one or more client devices according to an exemplary embodiment of this disclosure.

With Reference to FIG. 9, a block diagram is shown of a system for managing the replication and storage of data sets associated with one or more client devices including a backup aggregator and operatively associated backup agent running on the one or more client devices according to an embodiment of this disclosure.

BDR Controller

FIG. 9 shows a block diagram illustrating embodiments of a BDR controller. In this embodiment, the BDR controller 901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BDR controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The BDR controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more computer systemization 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 902.11n, Bluetooth 3.0, FM, global positioning system (GPS) (thereby allowing BDR controller to determine its location)); Broadcom BCM4329FKUBG transceiver chip (e.g., providing 902.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the BDR controller and beyond through various interfaces. Should processing requirements dictate a greater amount speed and/or capacity, distributed processors (e.g., Distributed BDR), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the BDR may be achieved by implementing a microcontroller such as CAST's R8051XC2 microcontroller; Intel's MCS 51 (i.e., 8051 microcontroller); and/or the like. Also, to implement certain features of the BDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BDR component collection (distributed or otherwise) and/or features may be implemented via the microprocessor and/or via embedded components; e.g., via ASIC, coprocessor, DSP, FPGA, and/or the like. Alternately, some implementations of the BDR may be implemented with embedded components that are configured and used to achieve a variety of features or signal processing.

Depending on the particular implementation, the embedded components may include software solutions, hardware solutions, and/or some combination of both hardware/software solutions. For example, BDR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the BDR features. A hierarchy of programmable interconnects allow logic blocks to be interconnected as needed by the BDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the BDR may be developed on regular FPGAs and then migrated into a fixed version that more resembles ASIC implementations. Alternate or coordinating implementations may migrate BDR controller features to a final ASIC instead of or in addition to FPGAs. Depending on the implementation all of the aforementioned embedded components and microprocessors may be considered the "CPU" and/or "processor" for the BDR.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the BDR thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the BDR controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed BDR), architectures may similarly be employed to pool, load balance, and/or otherwise increase the communicative bandwidth required by the BDR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the BDR controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the BDR controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the BDR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the BDR controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory. The memory 929 may further include scheduling module 946 and retention module 945.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the BDR component(s) 935; PAE component 941; CIH component 942; VRG component 943; RP component 944; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the BDR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, MICROSOFT DOS, MICROSOFT Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the BDR controller to communicate with other entities through a communications network 913. Various communication protocols may be used by the BDR controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, MICROSOFT's Internet Information Server, and/or the like. The information server may allow for the execution of program components through facilities such as Active Server Page (ASP), ActiveX, (ANSI) (Objective-)C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., AMERICA ONLINE (AOL) INSTANT MESSENGER (AIM), Application Exchange (APEX), ICQ, Internet Relay Chat (IRC), MICROSOFT Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), YAHOO! Instant Messenger Service, and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the BDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BDR database 919, operating systems, other program components, user interfaces, Web browsers, and/or the like.

Access to the BDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BDR. In one embodiment, the information server would provide a Web form accessible by a Web browser. Entries made into supplied fields in the Web form are tagged as having been entered into the particular fields and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the BDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, MICROSOFT's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, YAHOO! User Interface, any of which may be used and provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as MICROSOFT Internet Explorer or NETSCAPE NAVIGATOR. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the BDR enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, MICROSOFT Exchange, and/or the like. The mail server may allow for the execution of program components through facilities such as ASP, ActiveX, (ANSI) (Objective-)C(++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/MICROSOFT Exchange, post office protocol (POP3), simple mail transfer protocol (SMTP), and/or the like. The mail server can route, forward, and process incoming and outgoing mail messages that have been sent, relayed and/or otherwise traversing through and/or to the BDR.

Access to the BDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, MICROSOFT Entourage, MICROSOFT Outlook, MICROSOFT Outlook Express, MOZILLA, Thunderbird, and/or the like. Mail clients may support a number of transfer protocols, such as: IMAP, MICROSOFT Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the BDR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the BDR component to engage in secure transactions if so desired. The cryptographic component facilitates the secure accessing of resources on the BDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The BDR Database

The BDR database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the BDR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the BDR database is implemented as a data-structure, the use of the BDR database 919 may be integrated into another component such as the BDR component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-j. A Users table 919a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a BDR. A Clients table 919b may include fields such as, but not limited to: client_id, client_name, client_ip, client_type, client_model, operating_system, os_version, app_installed_flag, and/or the like. A Machines table may support and/or track multiple entity accounts on a BDR. A Machines table 919c may include fields such as, but not limited to: machine_id, machine_type, machine_index and/or the like. A Dataset table 919d may include fields such as, but not limited to: ds_id, ds_origin, ds_type, ds_name and/or the like. A Vectors table 919e may include fields such as, but not limited to: vec_id, vec_primaryMachine, vec_secondaryMachine, vec_dataset and/or the like. A Snapshots table 919f may include fields such as, but not limited to: snp_machine, snp_dataset, snp_timeStamp, and/or the like. An Incrementals table 919g may include fields such as, but not limited to: inc_machine, inc_dataset, inc_timeStamp0, inc_timeStamp1, inc_path, and/or the like. A Targets table 919h may include fields such as, but not limited to: tgt_deviceID, tgt_primaryServerID, tgt_secondaryServerID, and/or the like. A SSHkeys table 919i may include fields such as, but not limited to: ssh_machine, ssh_address, ssh_key, and/or the like. An Actions table 919j may include fields such as, but not limited to: act_id, act_action, act_machine, act_dataset, act_timeStamp0, act_timeStamp1, act_state, act_pid, and/or the like.

In one embodiment, the BDR database may interact with other database systems. For example, employing a distributed database system, queries and data access by search BDR component may treat the combination of the BDR database, an integrated data security layer database as a single database entity.

In one embodiment, user programs may contain various user interface primitives, which may serve to update the BDR. Also, various accounts may require custom database tables depending upon the environments and the types of clients the BDR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-j. The BDR may be configured to keep track of various settings, inputs, and parameters via database controllers.

The BDR database may communicate to and/or with other components in a component collection, including itself, and/or facilities of the like. Most frequently, the BDR database communicates with the BDR component, other program components, and/or the like. The database may contain, retain, and provide information regarding other nodes and data.

The BDRs

The BDR component 935 is a stored program component that is executed by a CPU. In one embodiment, the BDR component incorporates any and/or all combinations of the aspects of the BDR that was discussed in the previous figures. As such, the BDR affects accessing, obtaining and the provision of information, services, transactions, and/or the like across various communications networks. The features and embodiments of the BDR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the BDR's features and facilities, and in many cases reduce the costs, energy consumption/requirements, and extend the life of BDR's underlying infrastructure; this has the added benefit of making the BDR more reliable. Similarly, many of the features and mechanisms are designed to be easier for users to use and access, thereby broadening the audience that may enjoy/employ and exploit the feature sets of the BDR; such ease of use also helps to increase the reliability of the BDR. In addition, the feature sets include heightened security as noted via the Cryptographic components 920, 926, 928 and throughout, making access to the features and data more reliable and secure.

The BDR component may transform machine datasets into replications and redundant ready-to-use backup files, and/or the like and use the BDR. In one embodiment, the BDR component 935 takes inputs, and transforms the inputs via various components (e.g., PAE Component 941, CIH Component 942, VRG Component 943, RP Component 944; and/or the like), into outputs (e.g., periodic server backup response, task processing assistance response, assisting node processing response, backup response, task processing assistance response, assisting node processing response, port forwarding for file transfer session response, and/or the like).

The BDR component enabling access of information between nodes may be developed by employing standard development tools and languages such as, but not limited to: Apache components, Assembly, ActiveX, binary executables, (ANSI) (Objective-)C(++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., MICROSOFT's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; YAHOO! User Interface; and/or the like), WebObjects, and/or the like. In one embodiment, the BDR server employs a cryptographic server to encrypt and decrypt communications. The BDR component may communicate to and/or with other components in a component collection, including itself, and/or facilities of the like. Most frequently, the BDR component communicates with the BDR database, operating systems, other program components, and/or the like. The BDR may contain, communicate, generate, obtain, and/or provide program component, system, user, and/or data communications, requests, and/or responses.

Distributed BDRs

The structure and/or operation of any of the BDR node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the BDR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.: w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is described in U.S. Pat. No. 9,594,636, by Mortensen et al., issued Mar. 14, 2017 and entitled "MANAGEMENT OF DATA REPLICATION AND STORAGE APPARATUSES, METHODS AND SYSTEMS".

Disclosed herein are embodiments including, but not limited to, the following:

[A1] A processor implemented method for adaptive scheduling and performing data backups of protected data, the protected data being received from a protected computing device operatively associated with a backup computing device, the method comprising: receiving a nominal backup schedule that indicates times for backing up the protected data; determining that a time differential between the nominal backup schedule and a current time metric is greater than a threshold; in response to the determination that the time differential is greater than the threshold, modifying the backup schedule so that times indicated in the modified backup schedule are at a higher frequency than a frequency of the indicated times of the nominal backup schedule; and performing a backup of the protected data using the modified backup schedule.

[A2] The method for adaptive scheduling and performing data backups of protected data according to paragraph [A1], wherein the method further comprises: prior to the determination that the time differential is greater than the threshold, determining that the protected computing device is offline; and subsequent to the determination that the protected computing device is offline, determining that the protected computing device is online; wherein the determination that the time differential is greater than the threshold is performed subsequent to the determination that the protected computing device is online.

[A3] The method for adaptive scheduling and performing data backups of protected data according to paragraph [A2], wherein: the protected computing device being online includes an active data transmitting connection from the protected computing device to the backup computing device; and the protected computing device being offline includes there being no active data transmitting connection from the protected computing device to the backup computing device.

[A4] The method for adaptive scheduling and performing data backups of protected data according to paragraph [A3], wherein the backup data storage repository is a local repository or a cloud repository.

[A5] The method for adaptive scheduling and performing data backups of protected data according to paragraph [A1], wherein the protected data comprises: a partial or whole image of a disk, a partial or whole hard disk volume, select files, or select data blocks.

[A6] The method for adaptive scheduling and performing data backups of protected data according to paragraph [A1], wherein receiving the nominal backup schedule includes receiving a series of times for attempted backups or the time of the most recent backup.

[A7] The method for adaptive scheduling and performing data backups of protected data according to paragraph [A1], wherein the current time metric includes a current time or a time since a last backup.

[A8] The method for adaptive scheduling and performing data backups of protected data according to paragraph [A1], further comprising performing a backup verification.

[A9] The method for adaptive scheduling and performing data backups of protected data according to paragraph [A1], further comprising: further in response to the determination that the time differential is greater than the threshold, performing a backup verification according to a comprehensive backup verification schedule, wherein the comprehensive verification backup schedule is more frequent than a nominal verification backup schedule.

[A10] The method for adaptive scheduling and performing data backups of protected data according to paragraph [A1], further comprising: further in response to the determination that the time differential is greater than the threshold, performing a backup verification according to a comprehensive backup verification schedule, wherein the comprehensive verification backup schedule checks more files for content than a nominal verification backup schedule.

[A11] The method for adaptive scheduling and performing data backups of protected data according to paragraph [A1], further comprising returning to the nominal schedule after N backups are acquired.

[A12] A backup system for adaptive scheduling and performing data backups of protected data following an offline period, the system comprising: at least one processor; and at least one memory including computer program code; the at least one memory and the computer program code configured to, with the at least one processor, cause the system at least to: receive a nominal backup schedule that indicates times for backing up the protected data; determine a time differential between the nominal backup schedule and a current time metric when the protected data is resumed online; compare the time differential to a threshold; if the time differential is greater than the threshold, modify the nominal backup schedule so that times indicated in the modified backup schedule are at a higher frequency than a frequency of the indicated times of the nominal backup schedule; and perform a backup of the protected data.

[A13]. The backup system for adaptive scheduling and performing data backups of protected data according to paragraph [A12], wherein the current time metric includes a current time or a time since a last backup.

[A14] The backup system for adaptive scheduling and performing data backups of protected data according to paragraph [A12], further comprising performing a backup verification.

[A15] The backup system for adaptive scheduling and performing data backups of protected data according to paragraph [A12], wherein said at least one processor is configured to execute said computer-readable instructions to cause said system to: return to the nominal schedule after N backups are acquired.

[A16] The backup system for adaptive scheduling and performing data backups of protected data according to paragraph [A12], wherein said at least one processor is configured to execute said computer-readable instructions to cause said system to: return to the nominal schedule after N backups are acquired, wherein N is a number of backups required to result in a same number of backups as if none were missed.

[A17] A processor implemented method for adaptive scheduling and performing data backups of protected data, comprising: receiving a nominal backup schedule that indicates times for backing up the protected data; receiving a signal associated with a reliability metric; determining that the reliability metric is greater than a corresponding threshold; and in response to the determination that the reliability metric is greater than the corresponding threshold: (i) modifying the backup schedule so that times indicated in the modified backup schedule are at a higher frequency than a frequency of the indicated times of the nominal backup schedule; and (ii) performing a backup of the protected data using the modified backup schedule.

[A18] The method for adaptive scheduling and performing data backups of protected data according to paragraph [A17], wherein the protected data comprises: a partial or whole image of a disk, a partial or whole hard disk volume, select files, or select data blocks.

[A19] The method for adaptive scheduling and performing data backups of protected data according to paragraph [A17], wherein receiving the nominal backup schedule includes receiving a series of times for attempted backups or the time of the most recent backup.

[A20] The method for adaptive scheduling and performing data backups of protected data according to paragraph [A17], further comprising performing a backup verification.

[A21] The method for adaptive scheduling and performing data backups of protected data according to paragraph [A17], further comprising: receiving a set of signals associated with reliability metrics, wherein each metric of the set: (i) has a corresponding threshold, and (ii) is below its corresponding threshold; and returning to the nominal schedule upon the receiving of the set of the reliability metrics.

[A22] The method for adaptive scheduling and performing data backups of protected data according to paragraph [A17], wherein the reliability metric includes a weather metric including at least one of: a high winds metric; a heavy rain metric; a lightning metric; a humidity metric; and a room temperature metric.

[A23] The method for adaptive scheduling and performing data backups of protected data according to paragraph [A17], wherein the reliability metric comprises a metric indicating at least one of: a location susceptible to poor transmission; a location susceptible to a power outage; a vibration; and a construction along a power line.

[A24] A backup system for adaptive scheduling and performing data backups of protected data following an offline period, the system comprising: at least one processor; and at least one memory including computer program code; the at least one memory and the computer program code configured to, with the at least one processor, cause the system at least to: receive a nominal backup schedule that indicates times for backing up the protected data; receive a signal associated with a reliability metric; if the reliability metric is greater than a corresponding threshold: (i) modify the backup schedule so that times indicated in the modified backup schedule are at a higher frequency than a frequency of the indicated times of the nominal backup schedule; and (ii) perform a backup of the protected data using the modified backup schedule; and if the reliability metric is not greater than the corresponding threshold, perform a backup of the protected data using the nominal backup schedule.

[A25] The backup system for adaptive scheduling and performing data backups of protected data according to paragraph [A24], wherein the at least one memory and the computer program code are configured to, with the at least one processor, to cause said system to: receive a set of signals associated with reliability metrics, wherein each metric of the set: (i) has a corresponding threshold, and (ii) is below its corresponding threshold; and return to the nominal schedule upon the receiving of the set of the reliability metrics.

[A26] The backup system for adaptive scheduling and performing data backups of protected data according to paragraph [A24], wherein the reliability metric includes a weather metric including at least one of: a high winds metric; a heavy rain metric; a lightning metric; a humidity metric; and a room temperature metric.

[A27] The backup system for adaptive scheduling and performing data backups of protected data according to paragraph [A24], wherein the reliability metric comprises a metric indicating at least one of: a location susceptible to poor transmission; a location susceptible to a power outage; a vibration; and a construction along a power line.

[A28] The backup system for adaptive scheduling and performing data backups of protected data according to paragraph [A24], wherein the reliability metric comprises a metric indicating a location derived from at least one of GPS data, Wi-Fi data, and an IP address.

[A29] The backup system for adaptive scheduling and performing data backups of protected data according to paragraph [A24], wherein the reliability metric is derived from a smart thermostat.

[A30] The backup system for adaptive scheduling and performing data backups of protected data according to paragraph [A24], wherein the at least one memory and the computer program code are configured to, with the at least one processor, further cause the system at least to: if the reliability metric is less than a second corresponding threshold, modify the backup schedule so that times indicated in the modified backup schedule are at a higher frequency than the frequency of the indicated times of the nominal backup schedule.

[A31] The backup system for adaptive scheduling and performing data backups of protected data according to paragraph [A24], wherein the at least one memory and the computer program code are configured to, with the at least one processor, further cause the system at least to: receive a set of signals, each signal of the set of signals associated with a reliability metric; apply a weight to each of the reliability metrics of the set of signals; and if a sum of the weighted reliability metrics passes a weighted reliability metric threshold, modify the backup schedule so that times indicated in the modified backup schedule are at a higher frequency than the frequency of the indicated times of the nominal backup schedule.

[A32] The backup system for adaptive scheduling and performing data backups of protected data according to paragraph [A24], wherein the at least one memory and the computer program code are configured to, with the at least one processor, to cause said system to: if the reliability metric is greater than the corresponding threshold, perform a backup verification according to a comprehensive backup verification schedule, wherein the comprehensive verification backup schedule is more frequent than a nominal verification backup schedule.

[A33] The backup system for adaptive scheduling and performing data backups of protected data according to paragraph [A24], wherein the at least one memory and the computer program code are configured to, with the at least one processor, to cause said system to: if the reliability metric is greater than the corresponding threshold, perform a backup verification according to a comprehensive backup verification schedule, wherein the comprehensive verification backup schedule checks more files for content than a nominal verification backup schedule.

[A34] The backup system for adaptive scheduling and performing data backups of protected data according to paragraph [A24], wherein the times indicated at a higher frequency in the modified backup schedule are times of full backups or differential backups.

[B1] A system for applying an adaptive data backup retention policy to adaptively prune data backups according to a reliability decision, the data backups stored on a backup computing device operatively associated with a protected computing device, the system comprising: a software agent configured to: (i) acquire data backups from the protected computing device and (ii) store the data backups on the backup computing device; a data backup retention policy manager configured to apply a retention policy to selectively prune the data backups stored on the backup computing device; the retention policy manager being configured to (i): receive at least one reliability metric, (ii) use the at least one reliability metric to decide to continue pruning according to a nominal schedule or prune according to a less aggressive schedule; and a pruning operator configured to prune data backups according to the schedule established by the decision of the retention policy manager to result in a chain of data backups with a greater than nominal population when the retention policy manager decides to prune according to the less aggressive schedule.

[B2] The system for applying the adaptive data backup retention policy according to paragraph [B1], wherein the greater than nominal population includes a higher density of data backups or a greater overall number of data backups than if the nominal schedule was followed.

[B3] The system for applying the adaptive data backup retention policy according to paragraph [B1], wherein the reliability metric includes information of missing scheduled backups of the protected computing device.

[B4] The system for applying the adaptive data backup retention policy according to paragraph [B3], wherein the reliability metric includes information of if one or both of the protected computing device and backup computing device are offline.

[B5] The system for applying the adaptive data backup retention policy according to paragraph [B1], wherein the reliability metric includes information of check-in failures between the protected computing device and the backup computing device.

[B6] The system for applying the adaptive data backup retention policy according to paragraph [B1], wherein the reliability metric is an address or connection that is different from a nominal address or connection.

[B7] The system for applying the adaptive data backup retention policy according to paragraph [B6], wherein the reliability metric is an address or connection that is different from the nominal address or connection is location dependent.

[B8] The system for applying the adaptive data backup retention policy according to paragraph [B1], wherein the reliability metric indicates a poor Wi-Fi connection.

[B9] The system for applying the adaptive data backup retention policy according to paragraph [B1], wherein: the reliability metric comprises a physical condition; and the physical condition includes at least one of: a power fluctuation; a room temperature; an equipment temperature; a humidity; a vibration; and a nearby construction.

[B10] The system for applying the adaptive data backup retention policy according to paragraph [B1], wherein: the reliability metric comprises a physical condition; and the physical condition comprises a weather forecast of at least one of: high winds; lightning; and heavy rain.

[B11] The system for applying the adaptive data backup retention policy according to paragraph [B1], wherein the data backups are snapshot backups configured to be stored in a snapshots table of the backup computing device.

[B12] The system for applying the adaptive data backup retention policy according to paragraph [B1], wherein the data backups are file backups.

[B13] A processor implemented method for pruning backups of a protected device, the backups stored on a backup computing device operatively associated with the protected computing device, the pruning done by applying an adaptive data backup retention policy, and the method comprising: a) acquiring the data backups from the protected computing device; b) applying a retention policy to selectively prune the data backups stored on the backup computing device according to a nominal retention policy, the nominal retention policy based on deleting backups that are older than a predetermined number of backups; c) receiving a reliability metric, and using the reliability metric to determine to prune according to a less aggressive retention policy, the less aggressive retention policy indicating to delete backups at a lower frequency than the nominal retention policy, and the less aggressive retention policy further indicating to delete backups at a lower frequency specifically around a period of unreliability indicated by the reliability metric; and d) pruning data backups according to the less aggressive schedule, resulting in a chain of data backups with a greater than nominal population.

[B14] The processor implemented method for pruning backups according to paragraph [B13], wherein the greater than nominal population includes a higher density of data backups or a greater overall number of data backups than if the nominal retention policy was followed.

[B15] The processor implemented method for pruning backups according to paragraph [B13], wherein the reliability metric includes information of missing scheduled backups of the protected computing device.

[B16] The processor implemented method for pruning backups according to paragraph [B15], wherein the reliability metric includes information of if one or both of the protected computing device and backup computing device are offline.

[B17] The processor implemented method for pruning backups according to paragraph [B13], wherein the reliability metric includes information of check-in failures between the protected computing device and the backup computing device.

[B18] The processor implemented method for pruning backups according to paragraph [B13], wherein the reliability metric is an address or connection that is different from a nominal address or connection.

[B19] The processor implemented method for pruning backups according to paragraph [B18], wherein the reliability metric is an address or connection that is different from the nominal address or connection is location dependent.

[B20] The processor implemented method for pruning backups according to paragraph [B13], wherein the reliability metric indicates a poor Wi-Fi connection.

[B21] The processor implemented method for pruning backups according to paragraph [B13], wherein: the reliability metric comprises a physical condition; and the physical condition includes at least one of: a power fluctuation; a room temperature; an equipment temperature; a humidity; a vibration; and a nearby construction.

[B22] The processor implemented method for pruning backups according to paragraph [B13], wherein: the reliability metric comprises a physical condition; and the physical condition comprises a weather forecast of at least one of: high winds; lightning; and heavy rain.

[B23] The processor implemented method for pruning backups according to paragraph [B13], wherein the data backups are snapshot backups, and the snapshot backups are stored in a snapshots table of the backup computing device.

[B24] The processor implemented method for pruning backups according to paragraph [B13], wherein the data backups are file backups.

[B25] A retention module for pruning backups of a protected computing device, the protected computing device operatively associated with a backup computing device, and the retention module configured to perform a method comprising: a) acquiring data backups from the protected computing device; b) applying a retention policy to selectively prune the data backups stored on the backup computing device according to a nominal retention policy, the nominal retention policy based on deleting backups that are older than a predetermined number of backups; c) receiving a reliability metric, and using the reliability metric to determine to prune according to a less aggressive retention policy, the less aggressive retention policy indicating to delete backups at a lower frequency than the nominal retention policy, and the less aggressive retention policy further indicating to delete backups at a lower frequency specifically around a period of unreliability indicated by the reliability metric; and d) pruning data backups according to the less aggressive schedule, resulting in a chain of data backups with a greater than nominal population.

[B26] The retention module for pruning backups according to paragraph [B25], wherein the reliability metric indicates a poor Wi-Fi connection.

[B27] The retention module for pruning backups according to paragraph [B25], wherein: the reliability metric comprises a physical condition; and the physical condition includes at least one of: a power fluctuation; a room temperature; an equipment temperature; a humidity; a vibration; and a nearby construction.

[B28] The retention module for pruning backups according to paragraph [B25], wherein: the reliability metric comprises a physical condition; and the physical condition comprises a weather forecast of at least one of: high winds; lightning; and heavy rain.

[B29] The retention module for pruning backups according to paragraph [B25], wherein the data backups are snapshot backups, and the snapshot backups are configured to be stored in a snapshots table of the backup computing device.

[B30] The retention module for pruning backups according to paragraph [B25], wherein the data backups are file backups.

[B31] A processor implemented method for applying an adaptive data backup retention policy to prune data backups according to an unreliability decision, comprising: with a backup computing device, acquiring data backups from a protected computing device; storing the data backups on the backup computing device; applying a retention policy to selectively prune the data backups stored on the backup computing device; using at least one reliability metric to decide to continue pruning according to a less aggressive schedule; and pruning data backups according to the schedule established by the decision to result in a chain of data backups with a greater than nominal population.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, many embodiments are not described with reference to any particular programming language. It will be appreciated that a variety of programming languages may be used to implement the teachings of many embodiments as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A processor implemented method for adaptive scheduling and performing data backups of protected data, the protected data being received from a protected computing device operatively associated with a backup computing device, the method comprising:
   receiving a nominal backup schedule that indicates times for backing up the protected data;
   determining that a time differential between the nominal backup schedule and a current time metric is greater than a threshold;
   in response to the determination that the time differential is greater than the threshold, modifying the backup schedule so that times indicated in the modified backup schedule are at a higher frequency than a frequency of the indicated times of the nominal backup schedule;

performing a backup of the protected data using the modified backup schedule; and further in response to the determination that the time differential is greater than the threshold, performing a backup verification according to a comprehensive backup verification schedule, wherein the comprehensive verification backup schedule is more frequent than a nominal verification backup schedule.

2. The method for adaptive scheduling and performing data backups of protected data according to claim 1, wherein the method further comprises:

prior to the determination that the time differential is greater than the threshold, determining that the protected computing device is offline; and subsequent to the determination that the protected computing device is offline, determining that the protected computing device is online;

wherein the determination that the time differential is greater than the threshold is performed subsequent to the determination that the protected computing device is online.

3. The method for adaptive scheduling and performing data backups of protected data according to claim 2, wherein:

the protected computing device being online includes an active data transmitting connection from the protected computing device to the backup computing device; and the protected computing device being offline includes there being no active data transmitting connection from the protected computing device to the backup computing device.

4. The method for adaptive scheduling and performing data backups of protected data according to claim 3, wherein the backup data storage repository is a local repository or a cloud repository.

5. The method for adaptive scheduling and performing data backups of protected data according to claim 1, wherein the protected data comprises: a partial or whole image of a disk, a partial or whole hard disk volume, select files, or select data blocks.

6. The method for adaptive scheduling and performing data backups of protected data according to claim 1, wherein receiving the nominal backup schedule includes receiving a series of times for attempted backups or the time of the most recent backup.

7. The method for adaptive scheduling and performing data backups of protected data according to claim 1, wherein the current time metric includes a current time or a time since a last backup.

8. The method for adaptive scheduling and performing data backups of protected data according to claim 1, further comprising performing a backup verification.

9. The method for adaptive scheduling and performing data backups of protected data according to claim 1, further comprising:

further in response to the determination that the time differential is greater than the threshold, performing a backup verification according to a comprehensive backup verification schedule, wherein the comprehensive verification backup schedule checks more files for content than a nominal verification backup schedule.

10. The method for adaptive scheduling and performing data backups of protected data according to claim 1, further comprising returning to the nominal schedule after N backups are acquired.

11. A backup system for adaptive scheduling and performing data backups of protected data following an offline period, the system comprising:

at least one processor;

and at least one memory including computer program code;

the at least one memory and the computer program code configured to, with the at least one processor, cause the system at least to:

receive a nominal backup schedule that indicates times for backing up the protected data;

determine a time differential between the nominal backup schedule and a current time metric when the protected data is resumed online;

compare the time differential to a threshold;

if the time differential is greater than the threshold, modify the nominal backup schedule so that times indicated in the modified backup schedule are at a higher frequency than a frequency of the indicated times of the nominal backup schedule;

perform a backup of the protected data; and return to the nominal schedule after N backups are acquired.

12. The backup system for adaptive scheduling and performing data backups of protected data according to claim 11, wherein the current time metric includes a current time or a time since a last backup.

13. The backup system for adaptive scheduling and performing data backups of protected data according to claim 11, further comprising performing a backup verification.

14. The backup system for adaptive scheduling and performing data backups of protected data according to claim 11, wherein said at least one processor is configured to execute said computer-readable instructions to cause said system to:

return to the nominal schedule after N backups are acquired, wherein N is a number of backups required to result in a same number of backups as if none were missed.

15. A processor implemented method for adaptive scheduling and performing data backups of protected data, comprising:

receiving a nominal backup schedule that indicates times for backing up the protected data;

receiving a signal associated with a reliability metric;

determining that the reliability metric is greater than a corresponding threshold; and in response to the determination that the reliability metric is greater than the corresponding threshold:

(i) modifying the backup schedule so that times indicated in the modified backup schedule are at a higher frequency than a frequency of the indicated times of the nominal backup schedule;

(ii) performing a backup of the protected data using the modified backup schedule, and (iii) performing a backup verification according to a comprehensive backup verification schedule, wherein the comprehensive verification backup schedule is more frequent than a nominal verification backup schedule.

16. The method for adaptive scheduling and performing data backups of protected data according to claim 15, wherein the protected data comprises: a partial or whole image of a disk, a partial or whole hard disk volume, select files, or select data blocks.

17. The method for adaptive scheduling and performing data backups of protected data according to claim 15, wherein receiving the nominal backup schedule includes receiving a series of times for attempted backups or the time of the most recent backup.

18. The method for adaptive scheduling and performing data backups of protected data according to claim 15, further comprising performing a backup verification.

19. The method for adaptive scheduling and performing data backups of protected data according to claim 15, further comprising:
   receiving a set of signals associated with reliability metrics, wherein each metric of the set: (i) has a corresponding threshold, and (ii) is below its corresponding threshold; and
   returning to the nominal schedule upon the receiving of the set of the reliability metrics.

20. The method for adaptive scheduling and performing data backups of protected data according to claim 15, wherein the reliability metric includes a weather metric including at least one of:
   a high winds metric;
   a heavy rain metric;
   a lightning metric;
   a humidity metric; and
   a room temperature metric.

21. The method for adaptive scheduling and performing data backups of protected data according to claim 15, wherein the reliability metric comprises a metric indicating at least one of:
   a location susceptible to poor transmission;
   a location susceptible to a power outage;
   a vibration; and
   a construction along a power line.

22. A backup system for adaptive scheduling and performing data backups of protected data following an offline period, the system comprising:
   at least one processor;
   and at least one memory including computer program code;
   the at least one memory and the computer program code configured to, with the at least one processor, cause the system at least to:
   receive a nominal backup schedule that indicates times for backing up the protected data;
   receive a signal associated with a reliability metric;
   if the reliability metric is greater than a corresponding threshold:
   (i) modify the backup schedule so that times indicated in the modified backup schedule are at a higher frequency than a frequency of the indicated times of the nominal backup schedule;
   (ii) perform a backup of the protected data using the modified backup schedule; and
   (iii) perform a backup verification according to a comprehensive backup verification schedule, wherein the comprehensive verification backup schedule is more frequent than a nominal verification backup schedule; and
   if the reliability metric is not greater than the corresponding threshold, perform a backup of the protected data using the nominal backup schedule.

23. The backup system for adaptive scheduling and performing data backups of protected data according to claim 22, wherein the at least one memory and the computer program code are configured to, with the at least one processor, to cause said system to:
   receive a set of signals associated with reliability metrics, wherein each metric of the set: (i) has a corresponding threshold, and (ii) is below its corresponding threshold; and
   return to the nominal schedule upon the receiving of the set of the reliability metrics.

24. The backup system for adaptive scheduling and performing data backups of protected data according to claim 22, wherein the reliability metric includes a weather metric including at least one of:
   a high winds metric;
   a heavy rain metric;
   a lightning metric;
   a humidity metric; and
   a room temperature metric.

25. The backup system for adaptive scheduling and performing data backups of protected data according to claim 22, wherein the reliability metric comprises a metric indicating at least one of:
   a location susceptible to poor transmission;
   a location susceptible to a power outage;
   a vibration; and
   a construction along a power line.

26. The backup system for adaptive scheduling and performing data backups of protected data according to claim 22, wherein the reliability metric comprises a metric indicating a location derived from at least one of GPS data, Wi-Fi data, and an IP address.

27. The backup system for adaptive scheduling and performing data backups of protected data according to claim 22, wherein the reliability metric is derived from a smart thermostat.

28. The backup system for adaptive scheduling and performing data backups of protected data according to claim 22, wherein the at least one memory and the computer program code are configured to, with the at least one processor, further cause the system at least to:
   if the reliability metric is less than a second corresponding threshold, modify the backup schedule so that times indicated in the modified backup schedule are at a higher frequency than the frequency of the indicated times of the nominal backup schedule.

29. The backup system for adaptive scheduling and performing data backups of protected data according to claim 22, wherein the at least one memory and the computer program code are configured to, with the at least one processor, further cause the system at least to:
   receive a set of signals, each signal of the set of signals associated with a reliability metric;
   apply a weight to each of the reliability metrics of the set of signals; and
   if a sum of the weighted reliability metrics passes a weighted reliability metric threshold, modify the backup schedule so that times indicated in the modified backup schedule are at a higher frequency than the frequency of the indicated times of the nominal backup schedule.

30. The backup system for adaptive scheduling and performing data backups of protected data according to claim 22, wherein the at least one memory and the computer program code are configured to, with the at least one processor, to cause said system to:
   if the reliability metric is greater than the corresponding threshold, perform a backup verification according to a comprehensive backup verification schedule, wherein the comprehensive verification backup schedule checks more files for content than a nominal verification backup schedule.

31. The backup system for adaptive scheduling and performing data backups of protected data according to claim 22, wherein the times indicated at a higher frequency in the modified backup schedule are times of full backups or differential backups.

32. A processor implemented method for adaptive scheduling and performing data backups of protected data, the protected data being received from a protected computing device operatively associated with a backup computing device, the method comprising:
- receiving a nominal backup schedule that indicates times for backing up the protected data;
- determining that a time differential between the nominal backup schedule and a current time metric is greater than a threshold;
- in response to the determination that the time differential is greater than the threshold, modifying the backup schedule so that times indicated in the modified backup schedule are at a higher frequency than a frequency of the indicated times of the nominal backup schedule;
- performing a backup of the protected data using the modified backup schedule; and
- further in response to the determination that the time differential is greater than the threshold, performing a backup verification according to a comprehensive backup verification schedule, wherein the comprehensive verification backup schedule checks more files for content than a nominal verification backup schedule.

33. A processor implemented method for adaptive scheduling and performing data backups of protected data, the protected data being received from a protected computing device operatively associated with a backup computing device, the method comprising:
- receiving a nominal backup schedule that indicates times for backing up the protected data;
- determining that a time differential between the nominal backup schedule and a current time metric is greater than a threshold;
- in response to the determination that the time differential is greater than the threshold, modifying the backup schedule so that times indicated in the modified backup schedule are at a higher frequency than a frequency of the indicated times of the nominal backup schedule;
- performing a backup of the protected data using the modified backup schedule; and
- returning to the nominal schedule after N backups are acquired.

34. A backup system for adaptive scheduling and performing data backups of protected data following an offline period, the system comprising:
- at least one processor;
- and at least one memory including computer program code;
- the at least one memory and the computer program code configured to, with the at least one processor, cause the system at least to:
- receive a nominal backup schedule that indicates times for backing up the protected data;
- determine a time differential between the nominal backup schedule and a current time metric when the protected data is resumed online;
- compare the time differential to a threshold;
- if the time differential is greater than the threshold, modify the nominal backup schedule so that times indicated in the modified backup schedule are at a higher frequency than a frequency of the indicated times of the nominal backup schedule;
- perform a backup of the protected data; and
- return to the nominal schedule after N backups are acquired, wherein N is a number of backups required to result in a same number of backups as if none were missed.

35. A processor implemented method for adaptive scheduling and performing data backups of protected data, comprising:
- receiving a nominal backup schedule that indicates times for backing up the protected data;
- receiving a signal associated with a reliability metric;
- determining that the reliability metric is greater than a corresponding threshold; and
- in response to the determination that the reliability metric is greater than the corresponding threshold:
  (i) modifying the backup schedule so that times indicated in the modified backup schedule are at a higher frequency than a frequency of the indicated times of the nominal backup schedule;
  (ii) performing a backup of the protected data using the modified backup schedule; and
  (iii) performing a backup verification according to a comprehensive backup verification schedule, wherein the comprehensive verification backup schedule checks more files for content than a nominal verification backup schedule.

36. A backup system for adaptive scheduling and performing data backups of protected data following an offline period, the system comprising:
- at least one processor;
- and at least one memory including computer program code;
- the at least one memory and the computer program code configured to, with the at least one processor, cause the system at least to:
- receive a nominal backup schedule that indicates times for backing up the protected data;
- receive a signal associated with a reliability metric;
- if the reliability metric is greater than a corresponding threshold:
  (i) modify the backup schedule so that times indicated in the modified backup schedule are at a higher frequency than a frequency of the indicated times of the nominal backup schedule;
  (ii) perform a backup of the protected data using the modified backup schedule;
  (iii) perform a backup verification according to a comprehensive backup verification schedule, wherein the comprehensive verification backup schedule checks more files for content than a nominal verification backup schedule; and
- if the reliability metric is not greater than the corresponding threshold, perform a backup of the protected data using the nominal backup schedule.

* * * * *